United States Patent
Shirilla

(10) Patent No.: US 6,733,145 B2
(45) Date of Patent: May 11, 2004

(54) FOLDING SOFTBOX

(75) Inventor: John E. Shirilla, 7726 Cliffview Dr., Poland, OH (US) 44514

(73) Assignee: John E. Shirilla, Poland, OH (US)

( * ) Notice: Subject to any disclaimer, the term of this patent is extended or adjusted under 35 U.S.C. 154(b) by 0 days.

(21) Appl. No.: 09/941,480

(22) Filed: Aug. 29, 2001

(65) Prior Publication Data
US 2002/0141172 A1 Oct. 3, 2002

Related U.S. Application Data
(60) Provisional application No. 60/228,647, filed on Aug. 29, 2000.

(51) Int. Cl.$^7$ .............................. G03B 15/06; F21V 1/06
(52) U.S. Cl. ........................... 362/16; 362/352; 362/450
(58) Field of Search .......................... 362/16, 352, 450, 362/382, 405, 431, 102, 358, 18; 135/126, 128, 130, 135, 25.1, 910, 28

(56) References Cited

U.S. PATENT DOCUMENTS

| | | | |
|---|---|---|---|
| 685,968 A | | 11/1901 | Brown |
| 739,437 A | * | 9/1903 | McComb ..................... 135/28 |
| 923,542 A | | 6/1909 | Losey |
| 2,205,860 A | | 6/1940 | Olds |
| 3,294,962 A | | 12/1966 | Hilzen |
| 3,821,542 A | | 6/1974 | Kitamura et al. |
| 3,851,164 A | | 11/1974 | Intrator |
| 3,873,821 A | * | 3/1975 | Larson ....................... 362/352 |
| 4,052,607 A | | 10/1977 | Larson |
| 4,075,472 A | | 2/1978 | Higuchi |
| 4,078,170 A | | 3/1978 | Sloop |
| 4,210,952 A | | 7/1980 | Ressmeyer |
| 4,446,506 A | | 5/1984 | Larson |
| 4,594,645 A | | 6/1986 | Terashita |
| 4,633,374 A | * | 12/1986 | Waltz et al. .................. 362/16 |
| 4,757,425 A | | 7/1988 | Waltz |
| 5,023,757 A | | 6/1991 | Shirilla |
| 5,331,524 A | * | 7/1994 | Tseng ......................... 362/102 |

OTHER PUBLICATIONS

Chimera—2001 Twenty Years of Family brochure.
Westcott—Still 75$^{th}$ Anniversary brochure—copyrighted 2001.
Redwing Innovation in Photographic Accessories brochure, no date.
Aurora Lite Bank—Aurora Electronic Flash brochure, no date.
Lastolite Professional Video Accessories brochure, no date.
Aurora Lite Bank brochure regarding softboxes, haloboxes, umbrellas and the like 1999.
International Search Report dated Mar. 2, 2003.

* cited by examiner

*Primary Examiner*—Sandra O'Shea
*Assistant Examiner*—Bao Truong
(74) *Attorney, Agent, or Firm*—Brouse McDowell; John M. Skeriotis

(57) ABSTRACT

A folding softbox is disclosed including a collapsible frame that is provided in a manner of an umbrella frame, i.e., a central post with ribs that projects outwardly from a first end of the post and curve toward a second end of the post. A strut extends between a mid-span portion of each rib and the post to hold the ribs away from the post in an operative position. The inner ends of the struts are interconnected and are selectively slidable coaxially about the post. When the inner ends of the struts are slid toward the second end of the post, the outer ends of the struts are pulled inwardly toward the post and, thus, pull the ribs inwardly toward the post into a second or collapsed position. The folding softbox includes a mounting apparatus adapted for releasably connecting to any of a wide variety of light sources.

16 Claims, 25 Drawing Sheets

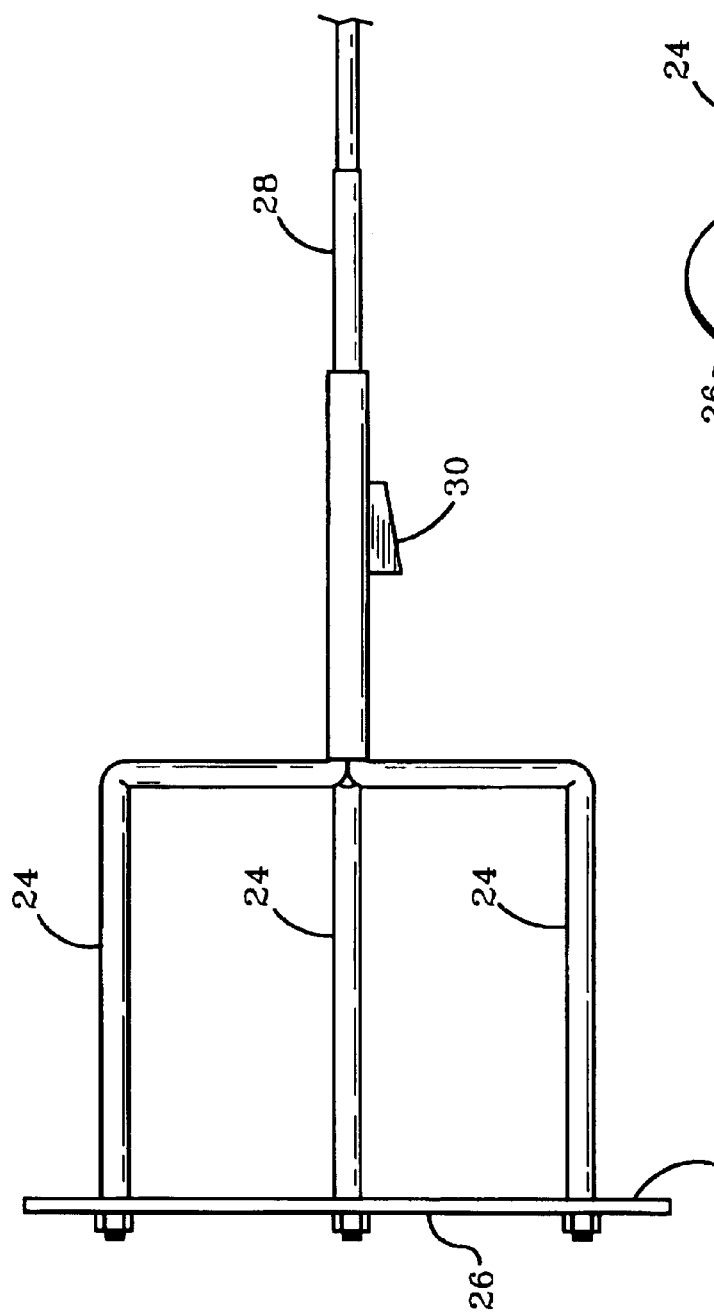
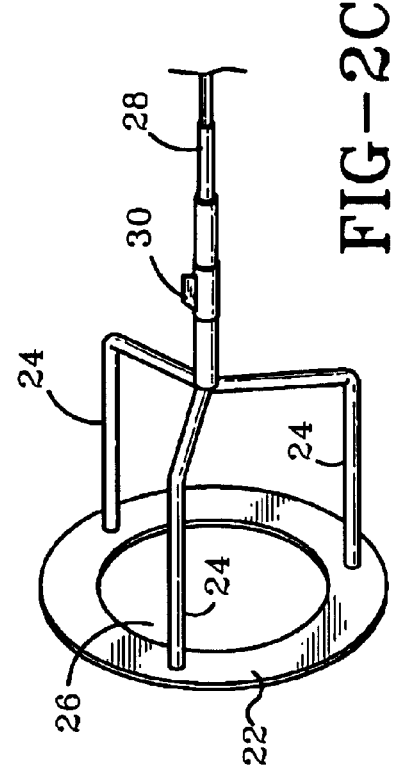
FIG-2B
FIG-2C

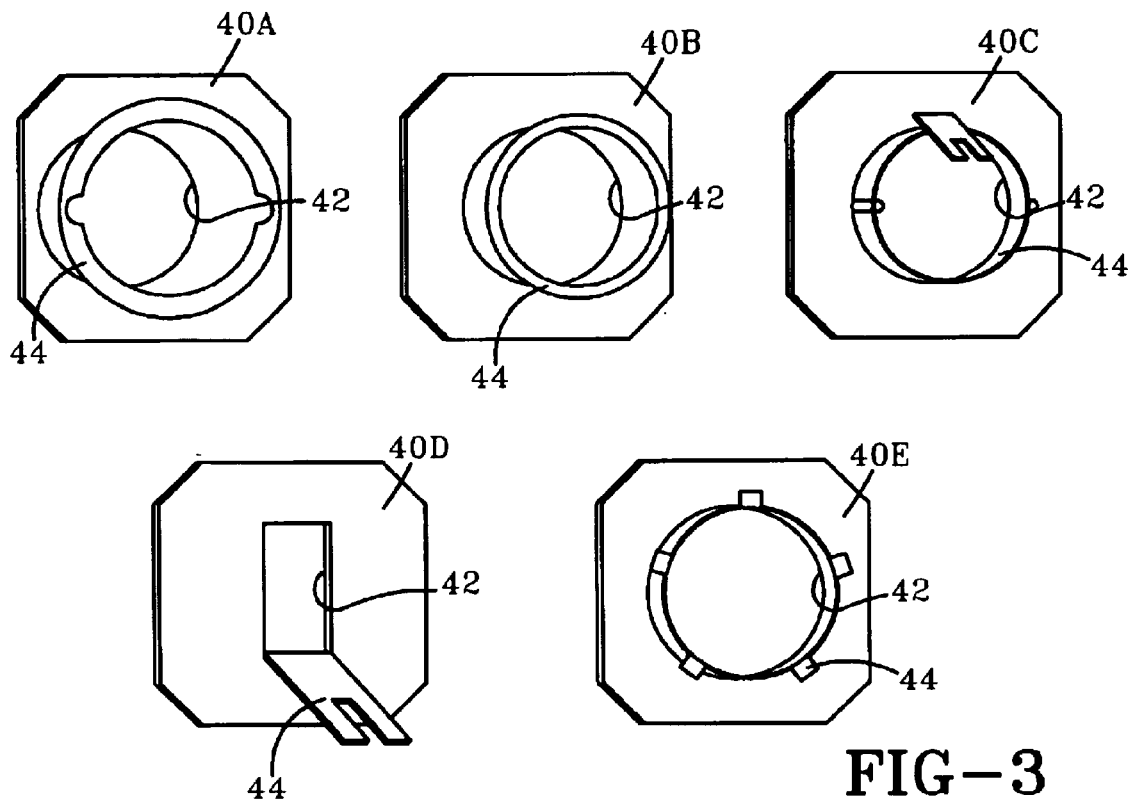
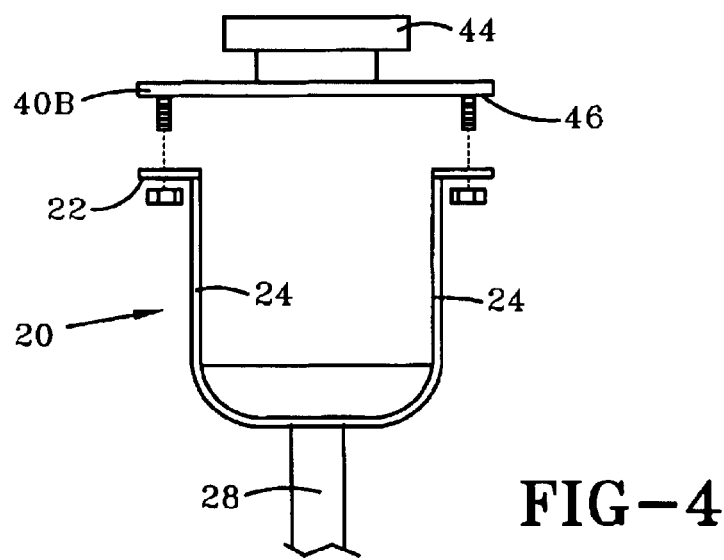

FOLDING SOFTBOX

BACKGROUND OF THE INVENTION

This application claims the benefit of U.S. Provisional Application, Serial No. 60/228,647 filed on Aug. 29, 2000, in Express Mail Label No. EL581515775US by the same inventor, John E. Shirilla, entitled Folding Softbox.

FIELD OF INVENTION

A light reflector that attaches to a strobe or other light source is commonly referred to in the photographic trade as a softbox. A softbox typically includes a mounting member adapted to mate with a corresponding mounting member connected to the strobe or other light source so that the light source projects into and/or through an opening defined in an innermost end of the softbox. Typically, a deflector is located adjacent to the light source to deflect light therefrom back toward the light source and the spread the light laterally outwardly away from the light source. This deflected light is incident on an inner reflective lining of the softbox. The inner reflective lining, in turn, directs the light incident thereon outwardly away from the light source toward and through an open mouth of the softbox that is opposite the inner most end where the light source is positioned. If desired, a diffusing cloth or other member is placed in covering relation with the mouth of the softbox to diffuse the light directed out of the mouth from the reflective inner surface.

While these softboxes have enjoyed widespread commercial success, several deficiencies are associated therewith. A primary deficiency is that these prior softboxes are not easily arranged for storage and transport. For example, one prior softbox must be at least partially disassembled in order to be folded and reduced in size. Another prior softbox is collapsible, but the light source is integrated into the softbox, itself, and this arrangement does not allow for interchanging multiple light sources with a single soft box as is often required.

DESCRIPTION OF THE RELATED ART

As stated within the field of the invention, the prior art softboxes all have the deficiency of assembly, storage and transport. One such prior art softbox is distributed by Aurora™ Photographic Products. The softboxes by Aurora utilize broads and struts to assemble the softbox for its operation. The prior art softboxes by Aurora typically have a two-piece construction for each strut. The tension associated in manipulating such strut into position is very tedious and difficult and does not easily lend itself to preparing for transportation of such softbox. Other prior art additionally uses an umbrella to reflect light for close-up lighting for other aesthetic purposes for photography. To date, no softbox is presently on the market which allows the light source to be adapted to an easily foldable and transportable device in a single unitary piece.

SUMMARY OF THE INVENTION

In accordance with the present invention, a folding softbox is provided. The softbox includes a collapsible frame that is provided in a manner of an umbrella frame, i.e., a central post with ribs that projects outwardly from a first end of the post and curve toward a second end of the post. A strut extends between a mid-span portion of each rib and the post to hold the ribs away from the post in an operative position. The inner ends of the struts are interconnected and are selectively slidable coaxially about the post. When the inner ends of the struts are slid toward the second end of the post, the outer ends of the struts are pulled inwardly toward the post and, thus, pull the ribs inwardly toward the post into a second or collapsed position.

Adjacent the first end of the post, the folding softbox includes a mounting apparatus adapted for releasably connecting to any of a wide variety of light sources. The mounting apparatus defines an opening through which the light sources extends into the recess defined by the umbrella-like frame. Preferably, a deflector is connected to the post adjacent the light source. The umbrella-like frame is covered with a flexible fabric layer so that a recess is defined by the frame when it is in its operative position. The fabric layer typically includes a black outer surface (the outer surface being the surface not exposed to the light source) and a reflective inner surface, typically comprising a silver Mylar covering or the like. A mouth of the recess is defined by the covering fabric layer, and the light from the light source exits the recess through the mouth after being deflected onto the reflective inner surface by the deflector. The mouth is preferably defined as a square, a rectangle, or at least hexagonal so as to approximate a circle. A diffuser, such as a white fabric piece is optionally selectively placed in covering relation with the mouth.

The mounting apparatus is preferably provided so that, when the subject softbox is connected to an associated light source, the softbox can be rotated relative to the light source as desired.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and herein:

FIGS. 2, 2A illustrate a backplate and a telescoping central post of the folding softbox of FIG. 1;

FIGS. 3, 3A illustrate a plurality of different light source adapter plates;

FIGS. 4, 4A illustrate connection of a backplate to the adapter plate of the present invention;

DESCRIPTION OF THE PREFERRED EMBODIMENT

Figure 1:
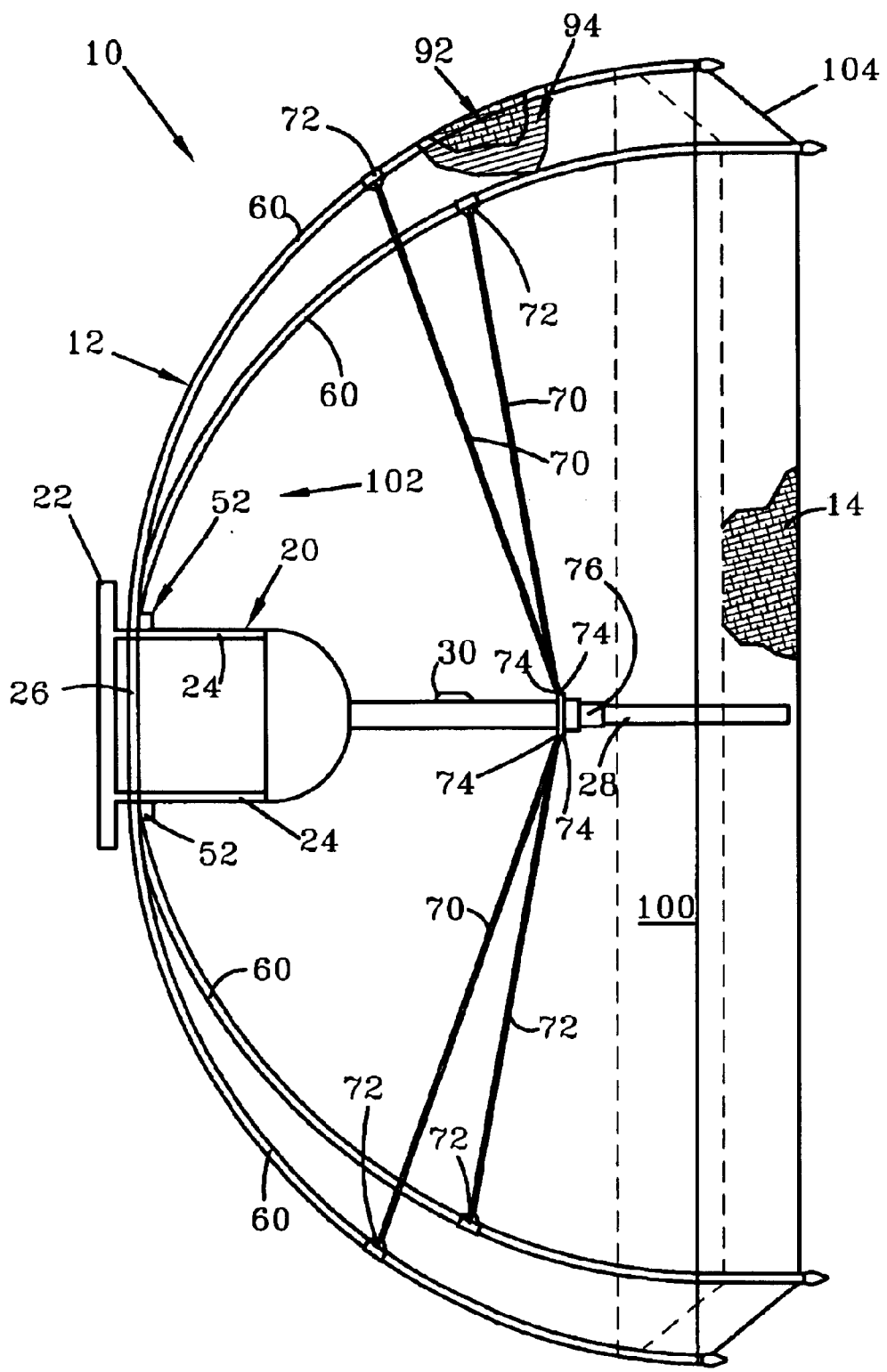
FIG. 1 is a side view of a folding softbox formed in accordance with the present invention (with the fabric covering layer only partially shown)

Referring now to the drawings wherein the showings are for purposes of illustrating a preferred embodiment of the invention only and not for purposes of limiting the same, a folding softbox formed in accordance with the present invention is shown at 10 in FIG. 1. The folding softbox comprises a collapsing frame 12 and a fabric layer 14 that covers the frame 12.

Figure 2A:
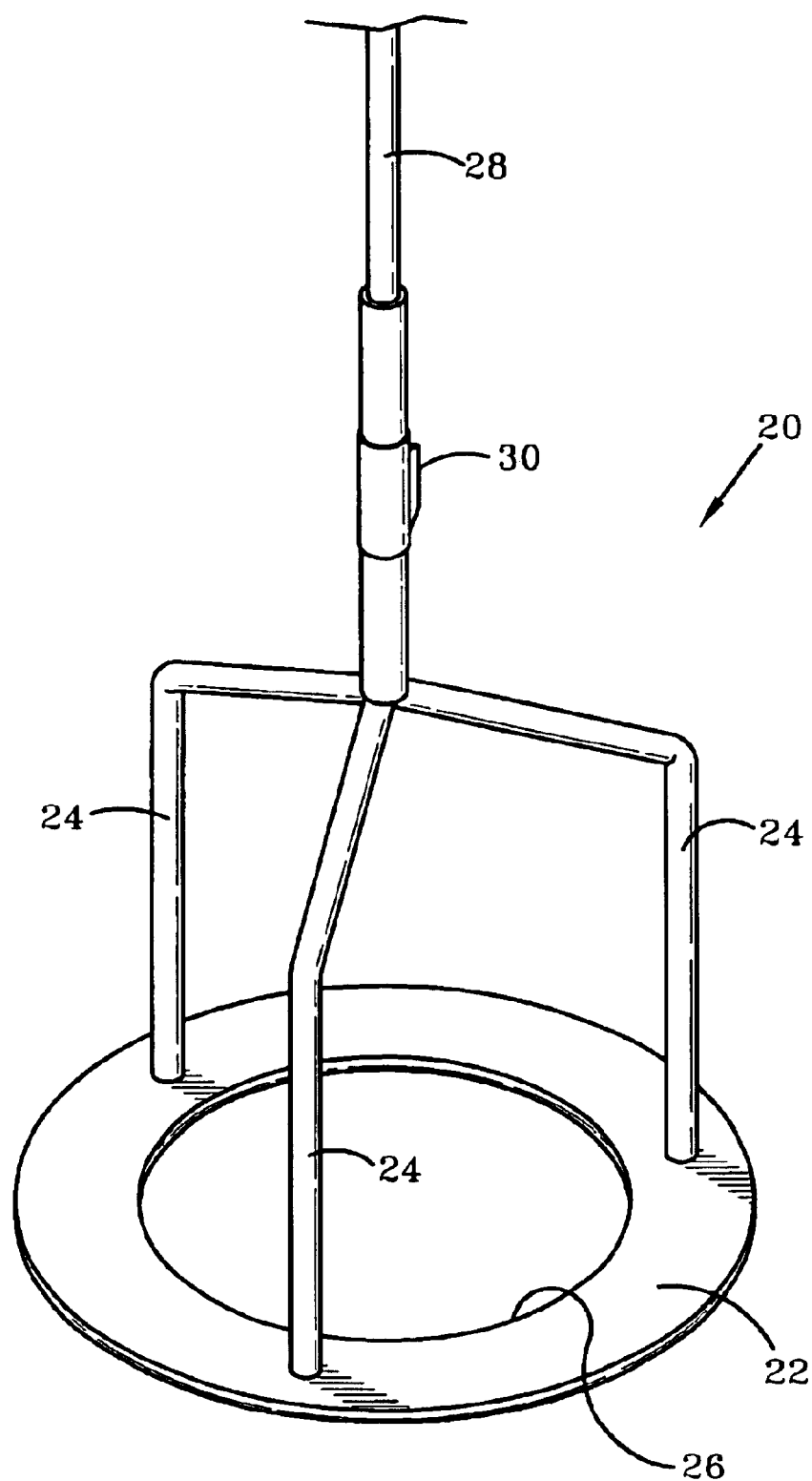

Referring also to FIGS. 2, 2A, the frame comprises an assembly 20 that includes an annular backplate 22 and a plurality of circumferentially spaced support posts 24 that project outwardly from the backplate 22. The backplate 22 defines an opening 26, and the support posts 24 are spaced and arranged so that a light source can be inserted through the opening 26 and positioned between the posts 24.

The support posts preferably converge together and a central post 28 projects outwardly therefrom. In a preferred embodiment, the central post 28 is a telescoping post, but it need not be. A conventional metal umbrella locking clip 30 is connected to the post.

Figure 3A:
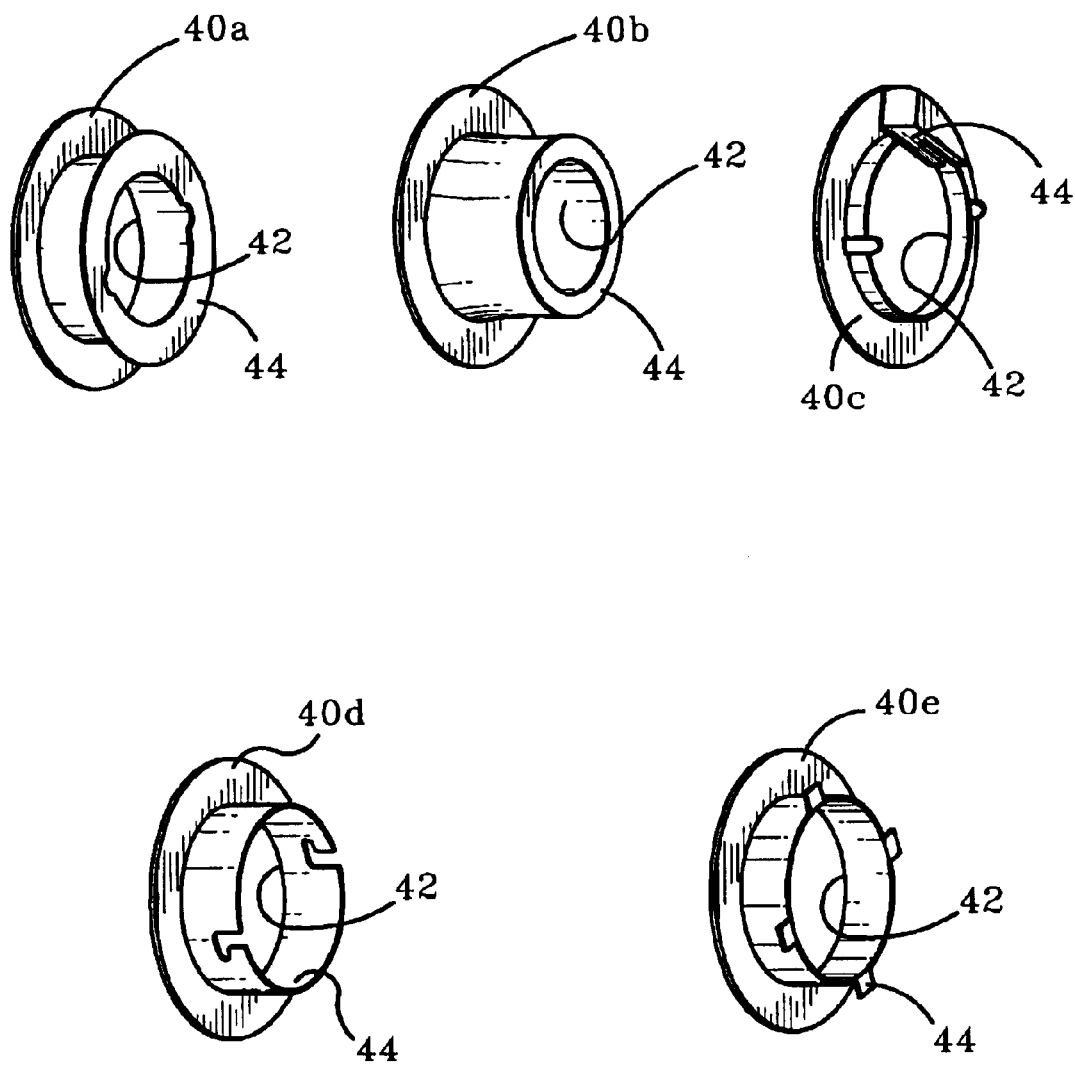

FIGS. 3, 3A illustrate a plurality of adapter plates 40a–40e. These are selectively connectable to the backplate 22 of the assembly 20. Each adapter plate 40a–40e defines an opening 42 adapted to receive a light source therethrough, and each includes a mounting ring or other mounting structure 44 adapted to mate selectively with a particular light source.

Figure 4A:
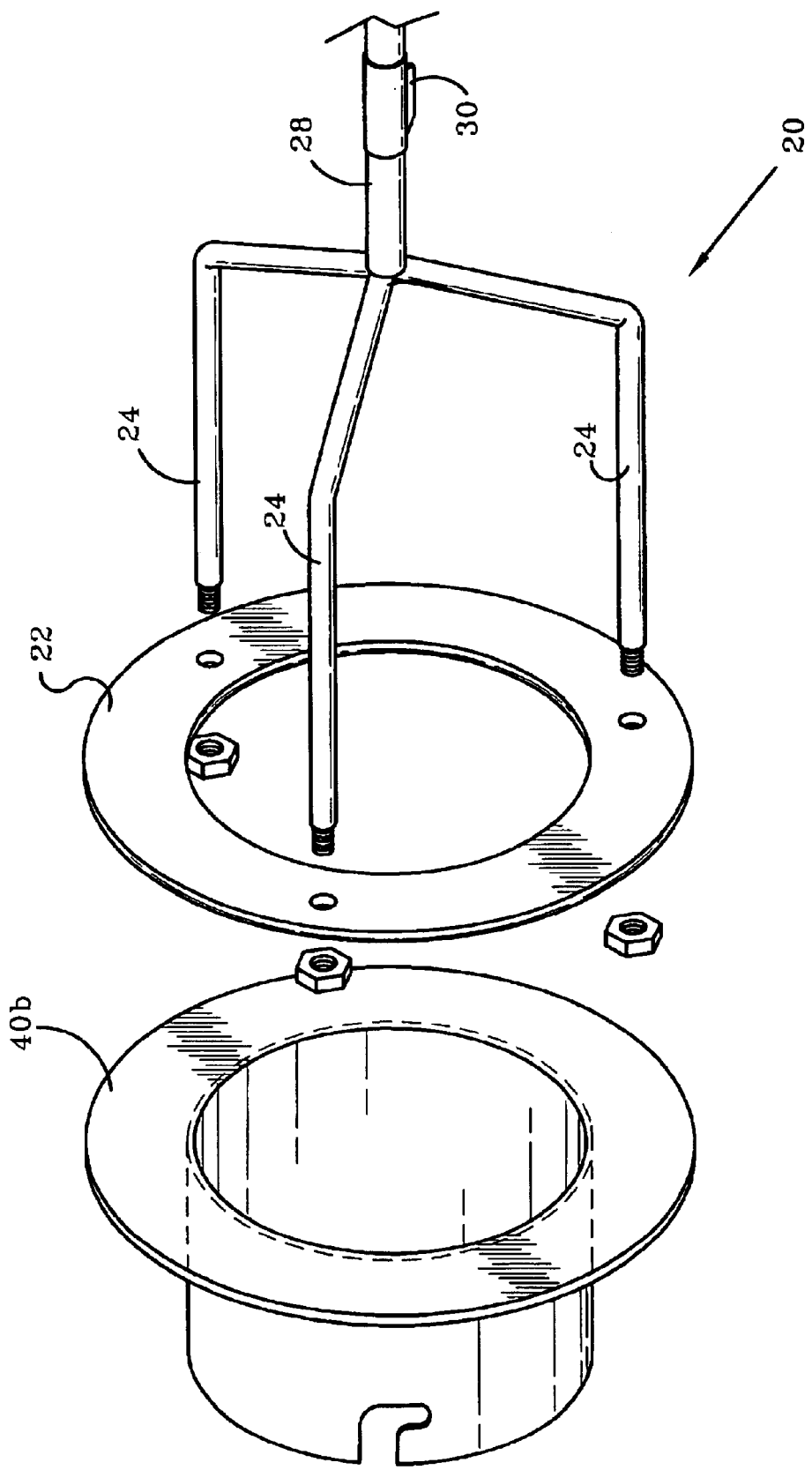
Figure 6A:
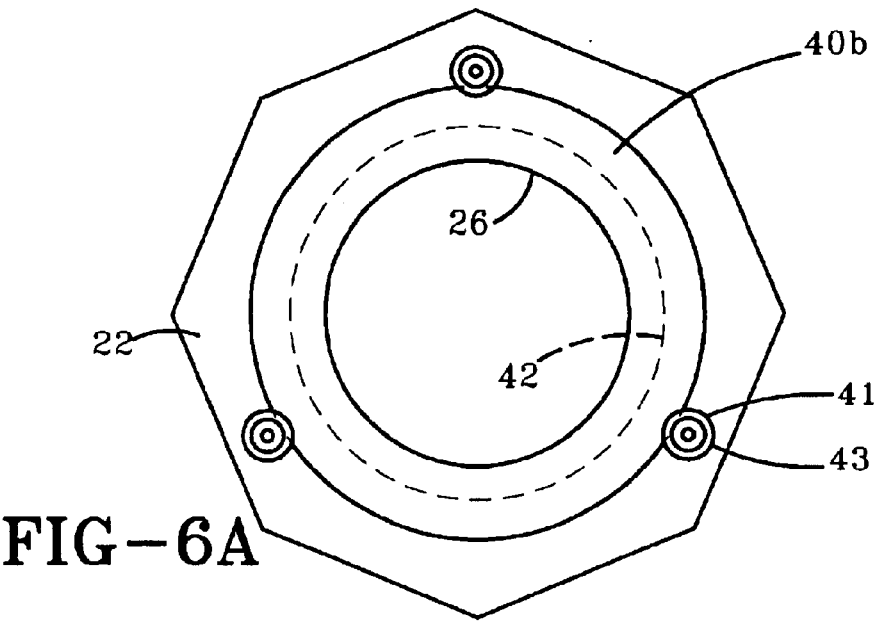
FIGS. 6A and 6B illustrate connection of the backplate to the adapter plate.
Figure 6B:
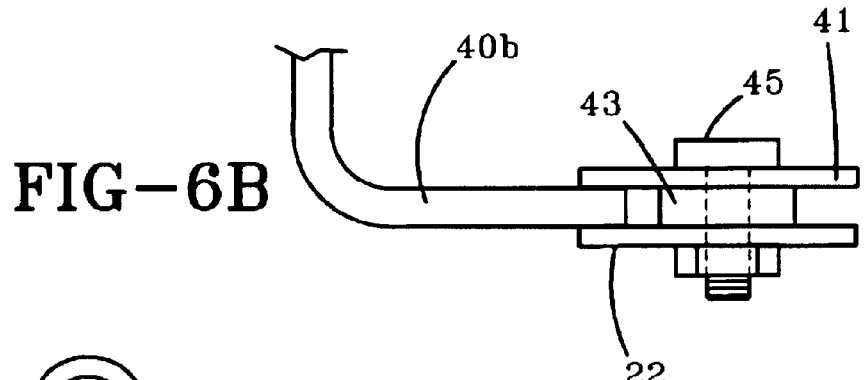
Figure 6C:
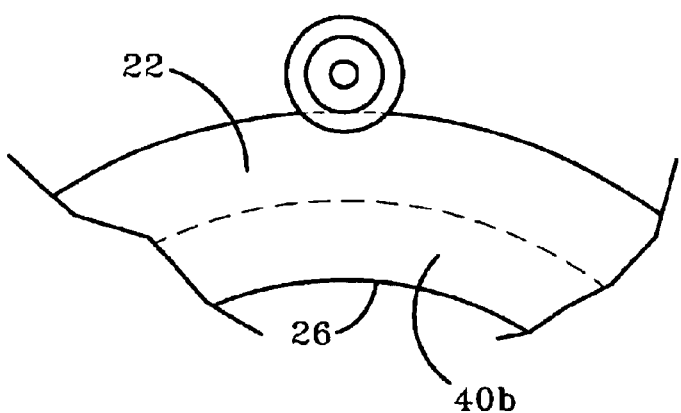

Any one of the adapter plates 40–40e is selectively connectable to the backplate 22 of the assembly 20 as desired for purposes of connecting a particular light source to the folding softbox 10. With reference to FIGS. 4, 4A the adapter plate 40b is connected to the backplate 22 by fastening the backplate 22 to the adapter plate 40b utilizing any type of fastening means, preferably, using a series of spacers/washers and screws. The adapter plate 40b must be able to rotate for proper alignment. The ring 44 is part of the adapter plate 40. Screws, bolts/nuts, clips, or other fastening means are employed to fixedly secure the backplate 22 to the adapter plate 40. FIGS. 6A–6B illustrate a most preferred means for connecting the adapter plates 40a–40e to the backplate 22 so that the two are rotatably secured to each other. Specifically, the backplate 22 is secured to the adapter plate 40 utilizing a large washer 41 connected to a stud 45 or other projecting fastener. A small washer 43 can be used to limit lateral play in the assembly and to prevent the large washer 41 from frictionally engaging the backplate 22.

Figure 5:
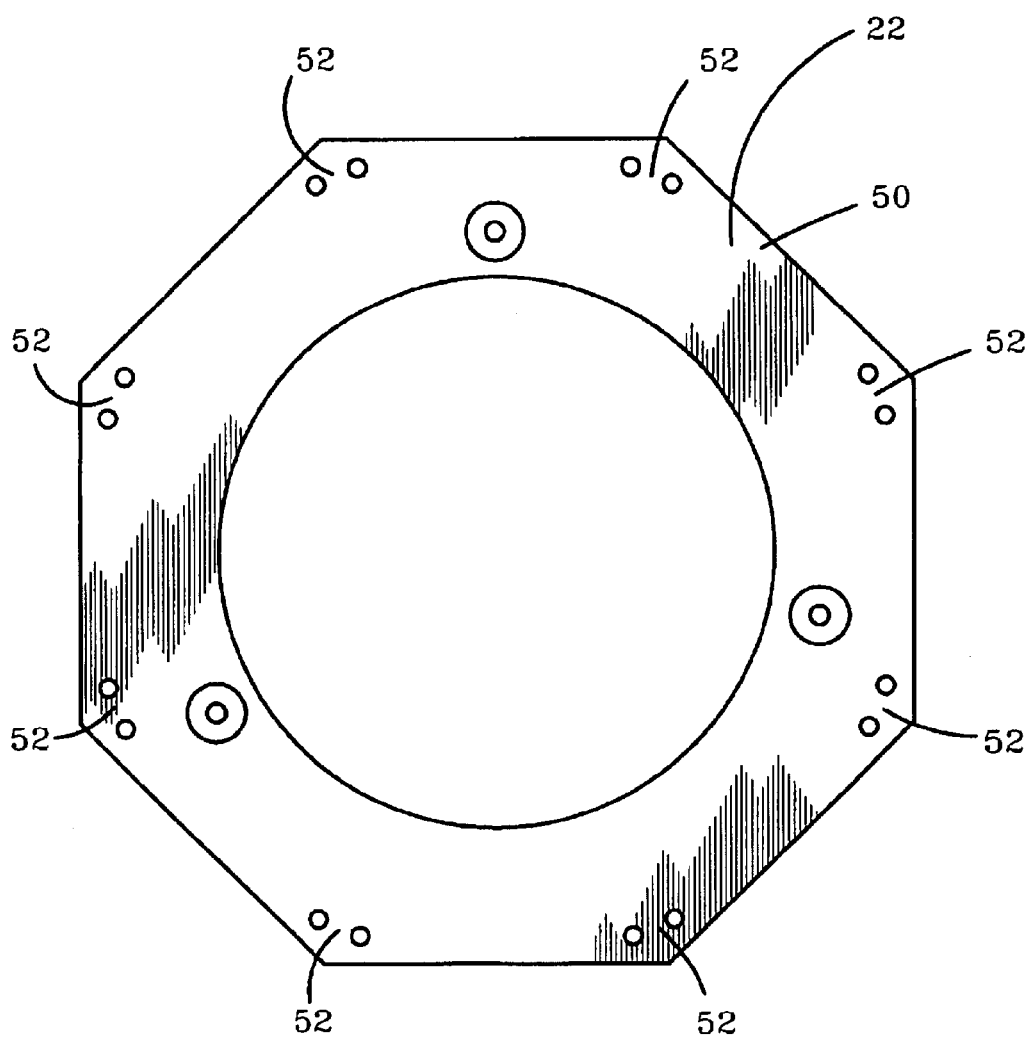
FIG. 5 is a plan view of a backplate formed in accordance with the present invention.

Referring now to FIG. 5, the backplate 22 is preferably conformed to have a perimeter with at least six flats 50, or can be circular or square, however, as will be discussed further herein, the fabric 14 tends to tear. The ribs 60 of the frame are pivotably connected to the backplate at locations 52. Referring now again to FIG. 1, the ribs 60 (preferably double, or multiple ribs) extend from the backplate 22 outwardly and away from the backplate 22 and are spaced apart from one another. For each rib, a strut 70 (which is also preferably double, or multiple) is provided and includes a first end 72 pivotably connected to a mid-span region of the associated rib 60 and a second end 74 pivotably connected to a locking member 76 that is coaxially and slidably positioned about the central post 28 and that is selectively engageable by the locking clip 30.

As those of ordinary skill in the art will appreciate, when the sliding member is slid on the post 28 toward the backplate 22 and engaged with the clip 30, the struts 70 are held post-perpendicular (less than 90 degrees) to the post 28 and hold the ribs in a spaced, operative configuration. Fabric 14 is used to cover the ribs and includes an outer layer or face 92, typically black in color, and a reflective inner layer or face 94 that is preferably defined by silver Mylar. When the ribs are in the above described operative configuration, the fabric is stretched taught and defines a recess 100 having an innermost end 102 in the region of the backplate 22 and defining an open mouth 104 through which light passes after being reflected by the inner fabric surface 94.

Of course, disengagement of the sliding locking member 76 from the clip 30 and movement of the same on the post 28 away from the backplate 22 causes the struts and ribs to collapse and lie adjacent the central post 28. If the central post 28 is telescoping, this facilitates smooth and uninterrupted movement of the sliding locking member 76 in both directions, i.e., toward and away from the backplate 22.

Figure 7:
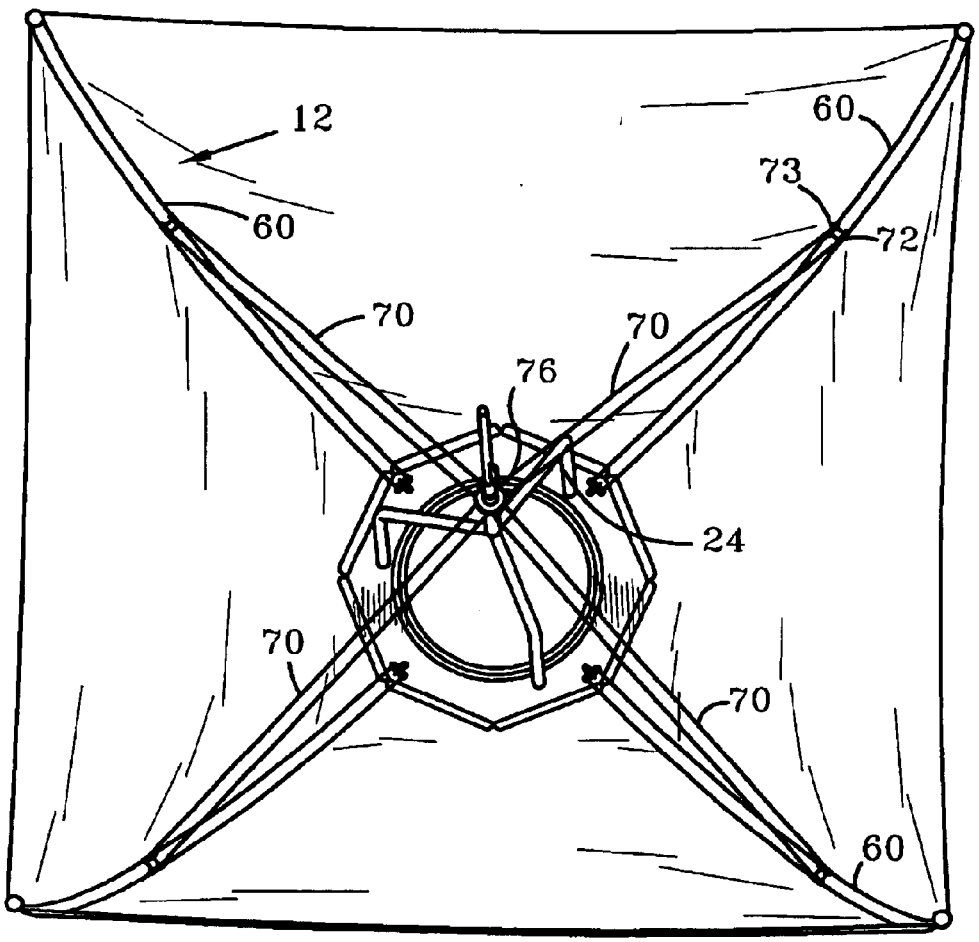
FIG. 7 is an inner perspective view of the softbox of FIG. 1.

FIG. 7 is an inner perspective view of the embodiment disclosed in FIG. 1. FIG. 7 shows the preferred embodiment in an assembled state and with a square/rectangular configuration by having four ribs 60 on the frame 12. However, it can be appreciated that many different configurations of this softbox are within the scope of this invention and are not limited to a square, rectangle, circular, etc., softbox. As shown in this assembled state, first end 72 of strut 70 is hinged by any type of hinge means 73 within rib 60 of frame 12. The location of the first end 72 (and hinge means 73) is most preferred to be in a position such that strut 70 deflects toward the backplate 22. The objective is for ease of assembly purposes. If the first end 72 (and hinge means 73) are designed in the aforementioned manner, then upon assembling the softbox in its assembled state, the amount of force needed to push the locking member 76 into its assembled state, upon central post 28, will be much easier due to the flexibility of strut 70 and material 14, and the members 76 will actually be pulled toward the backplate 22 into its locked position. Typically, in this state, the struts 70 are in a deflected position toward the inner portion of the softbox. With reference to members 76, it is preferably made of aluminum or like heat-resistant material since the lights/photographic equipment attached to the backplate 22 generally become hot. The assembly 20 actually acts as a heat sink to absorb the heat from the light source. Therefore, it is highly desirable to have the members 76 made of aluminum since plastic will tend to become soft and may release from umbrella locking clip 30.

Figure 8:
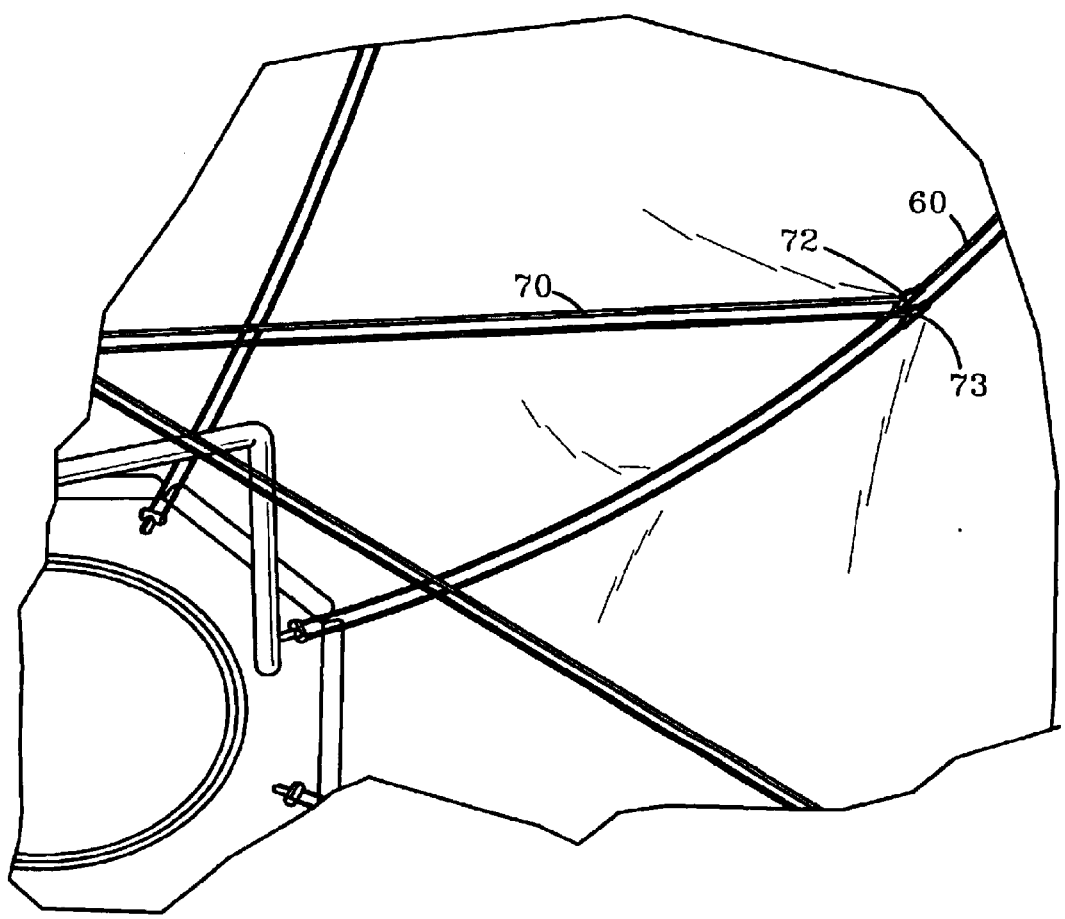
FIG. 8 is a perspective view showing the multiple rib strut design.

With reference to FIG. 8, hinge means 73 is shown more clearly mounting the first end 72 of strut 70 to ribs 60 of frame 12. Hinge means 73 allow strut 70 to pivot within the hinge means 73. Again, the preferred embodiment is shown as a double-ribbed design for the struts 70, however, a single or multiple rib design is also within the scope of this invention.

Figure 9:
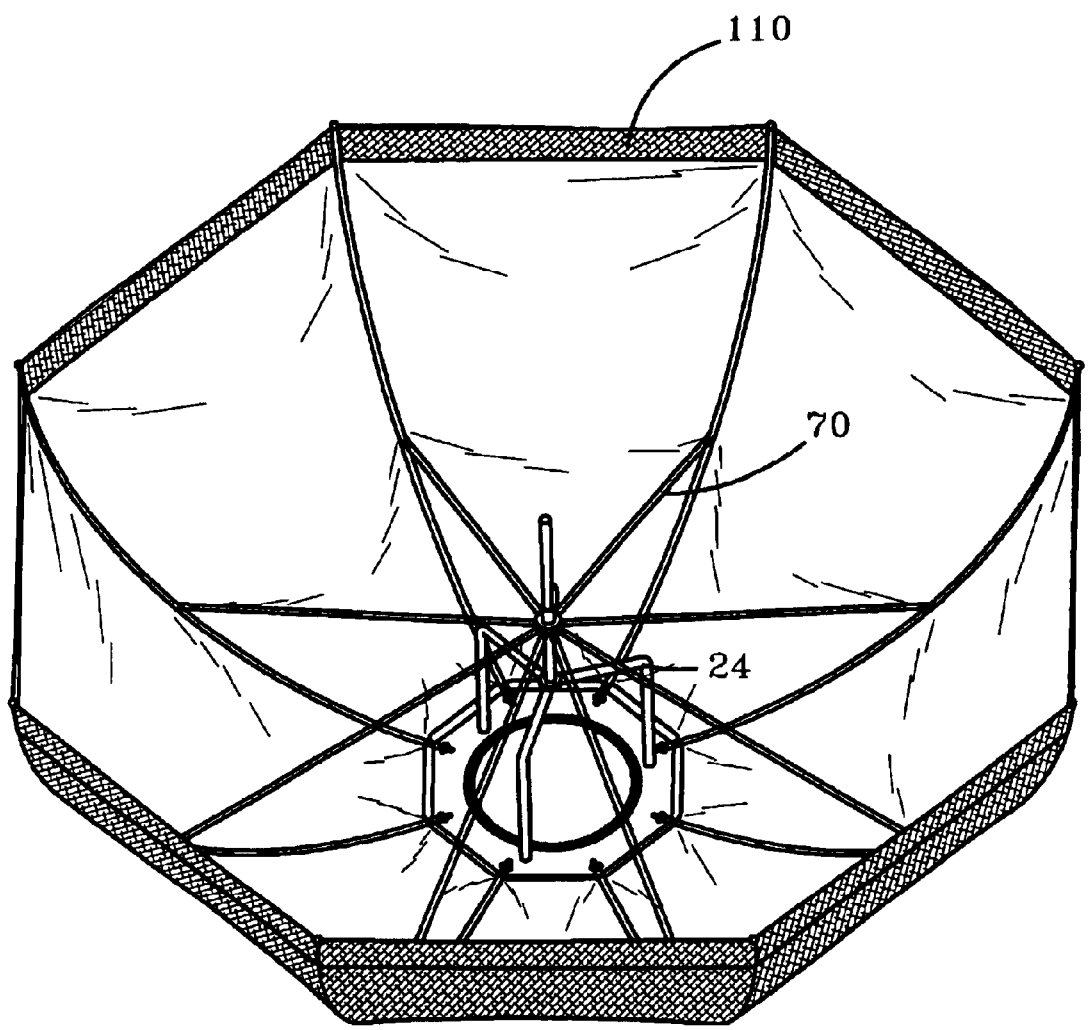
FIG. 9 is a perspective view of a first alternative embodiment of the present invention.

With reference to FIG. 9, a first alternative embodiment 110 of the present invention is shown having an octagonal design of a folding softbox. As seen within FIG. 9, struts 70 are now increased to 8, however, the circumferentially-spaced support posts 24 are still three. The first alternative embodiment is octagonal and can be utilized with all the features of the preferred embodiment.

Figure 10:
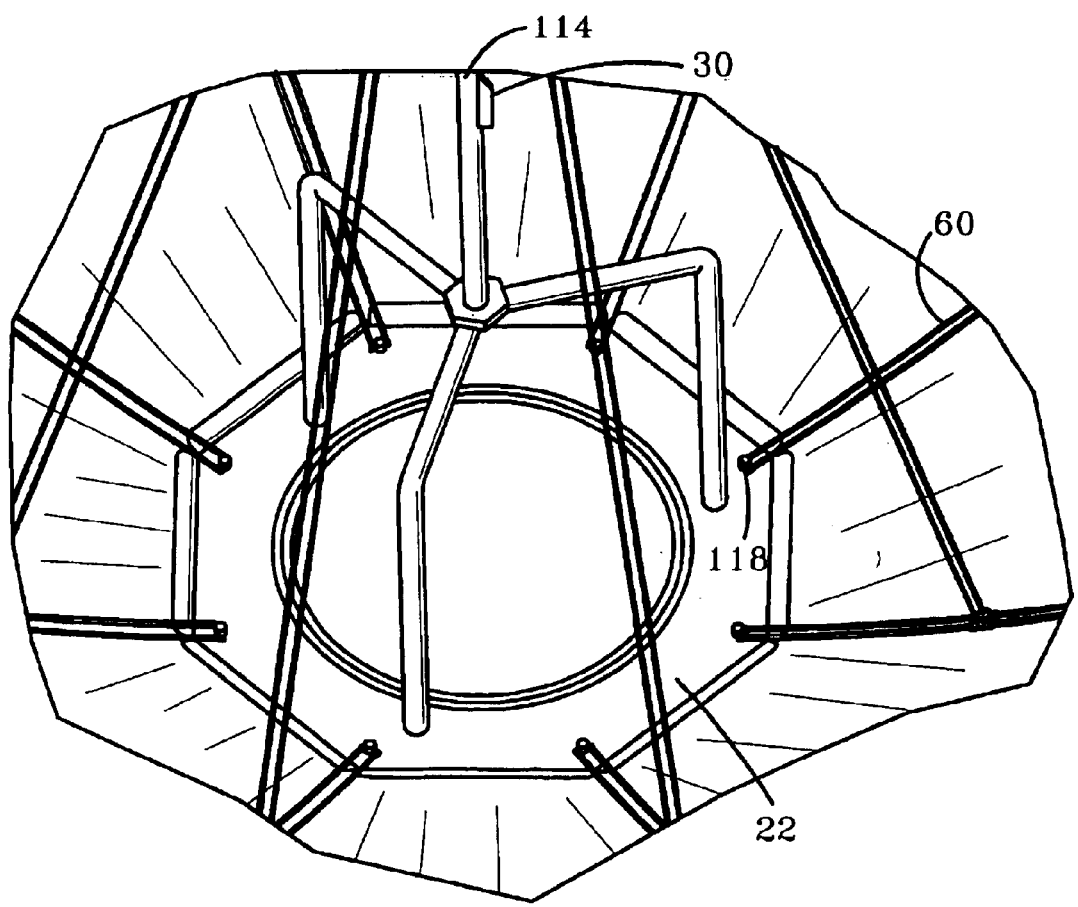
FIG. 10 is a perspective view of a first alternative embodiment utilizing a non-telescoping central post.
Figure 12:
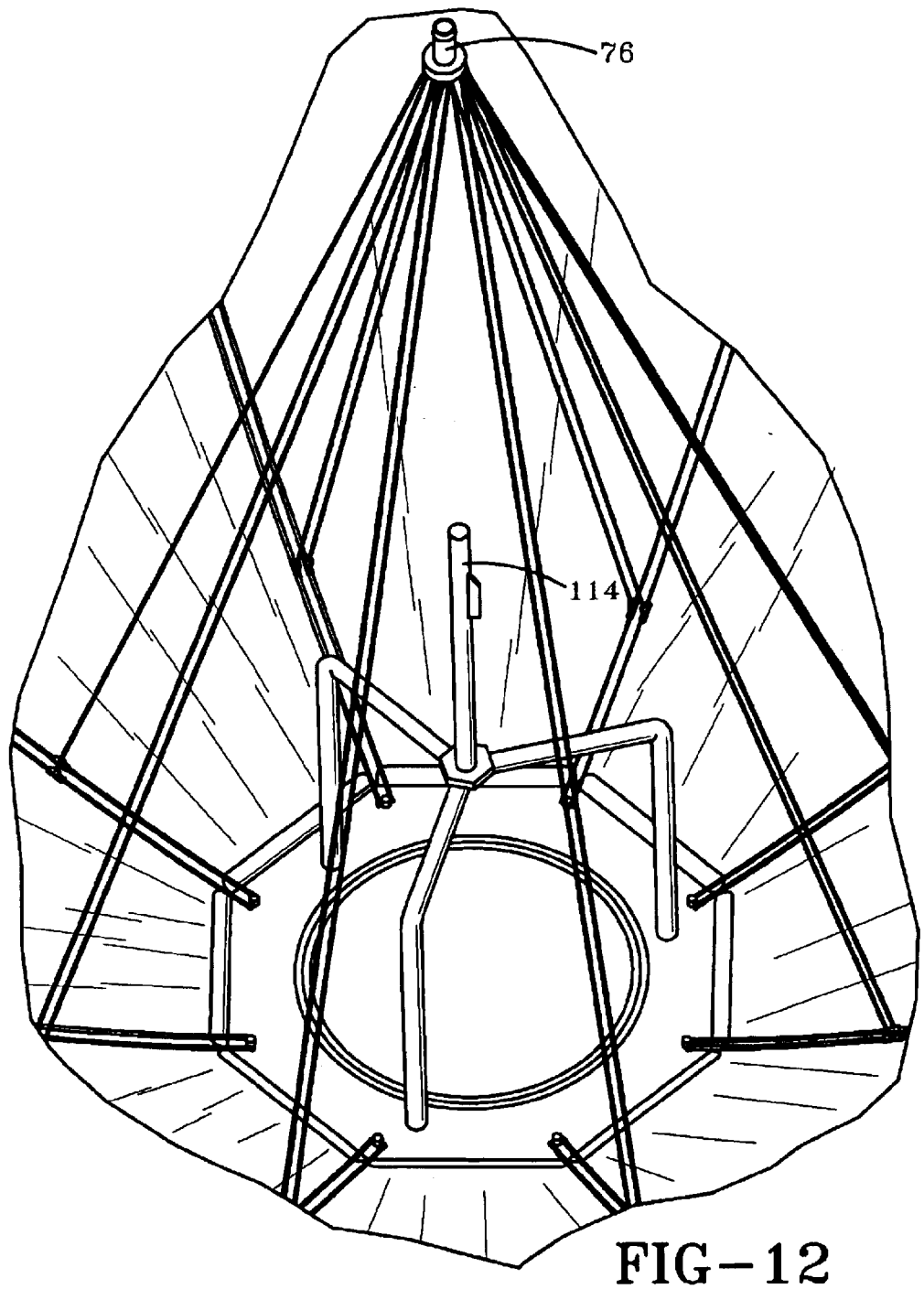
FIG. 12 is an inner perspective view of the first alternative embodiment in an unassembled state.
Figure 13:
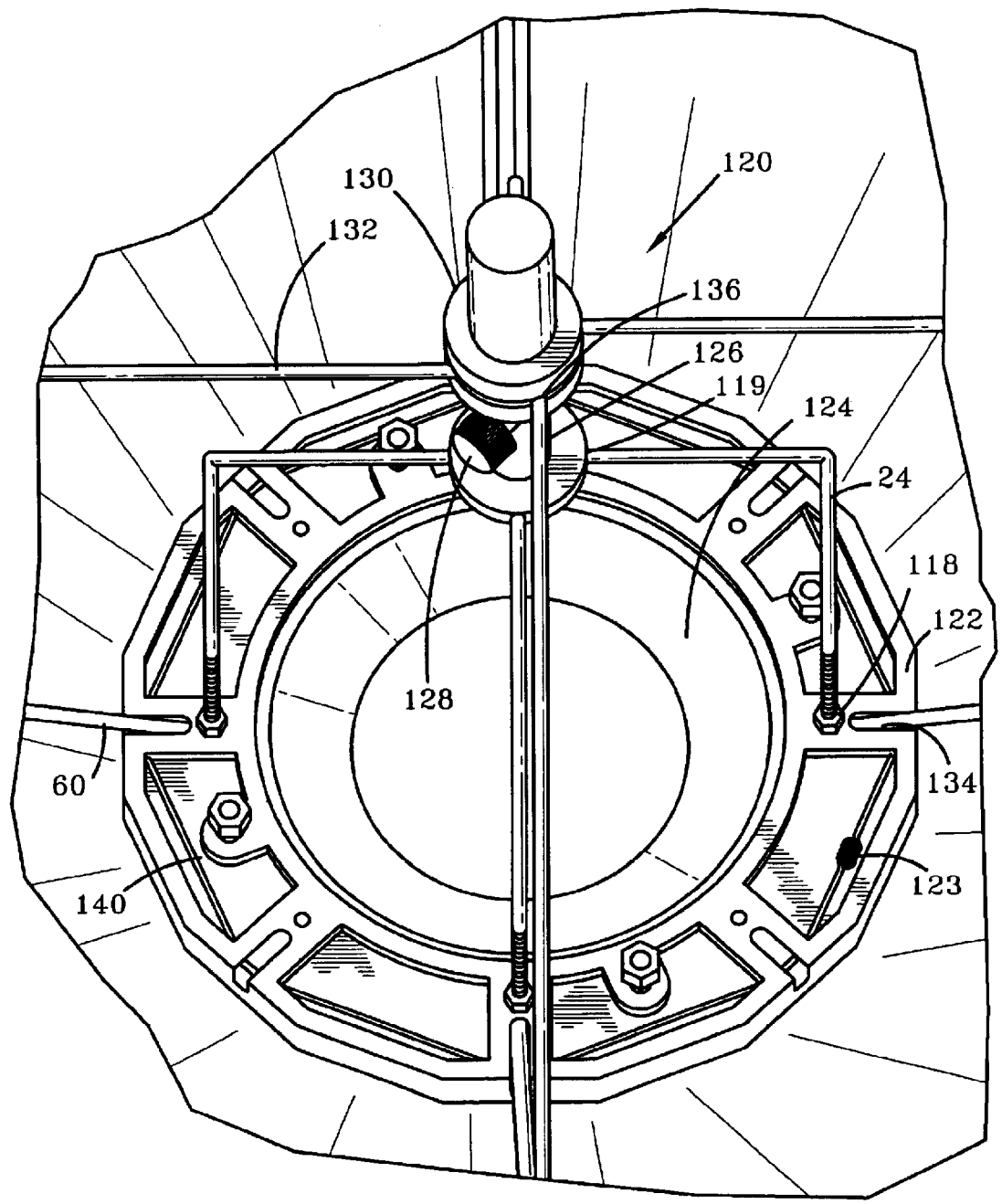
FIG. 13 is a inner perspective view of another alternative embodiment of the present invention shown in an assembled state.
Figure 14:
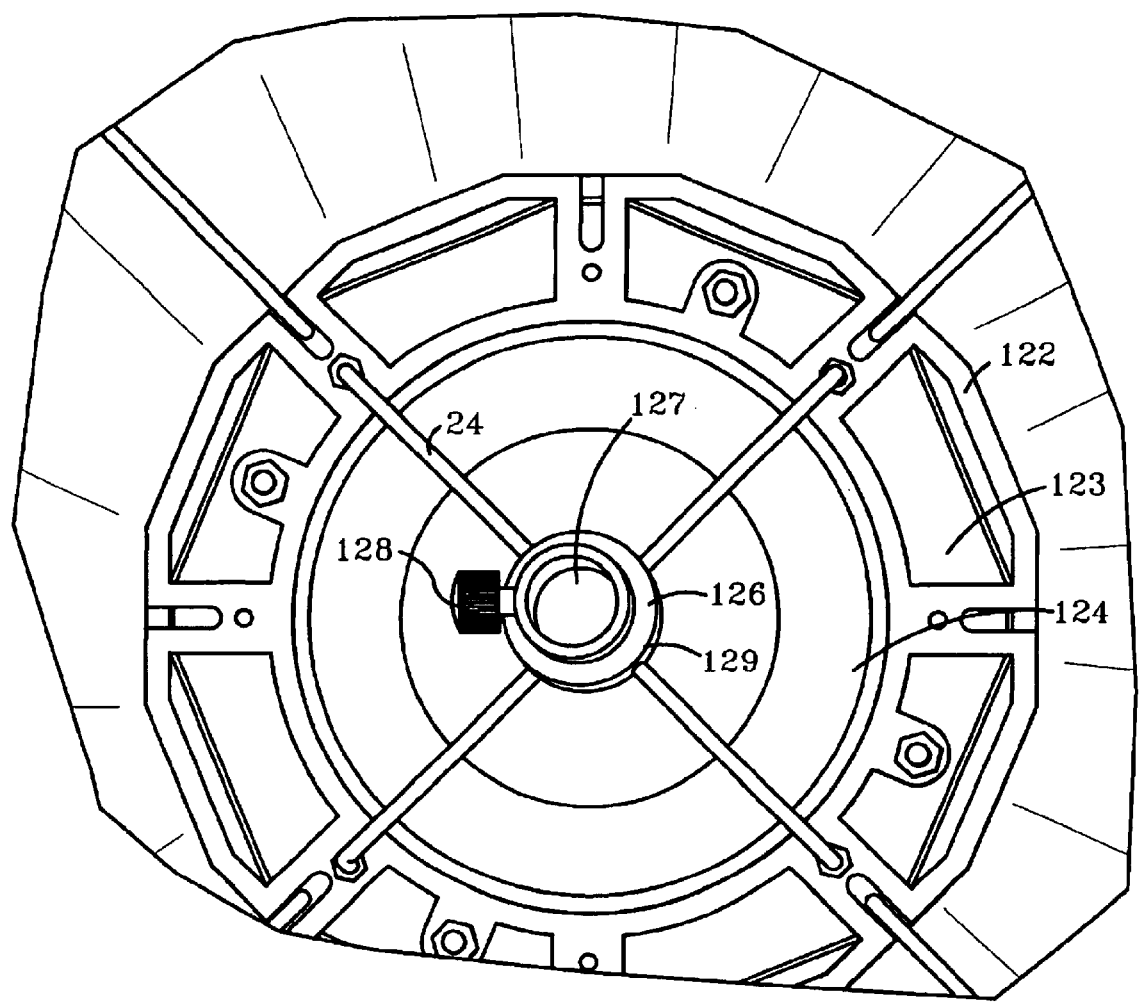
FIG. 14 is an inner top view of the alternative embodiment of FIG. 13 in an unassembled state.
Figure 15:
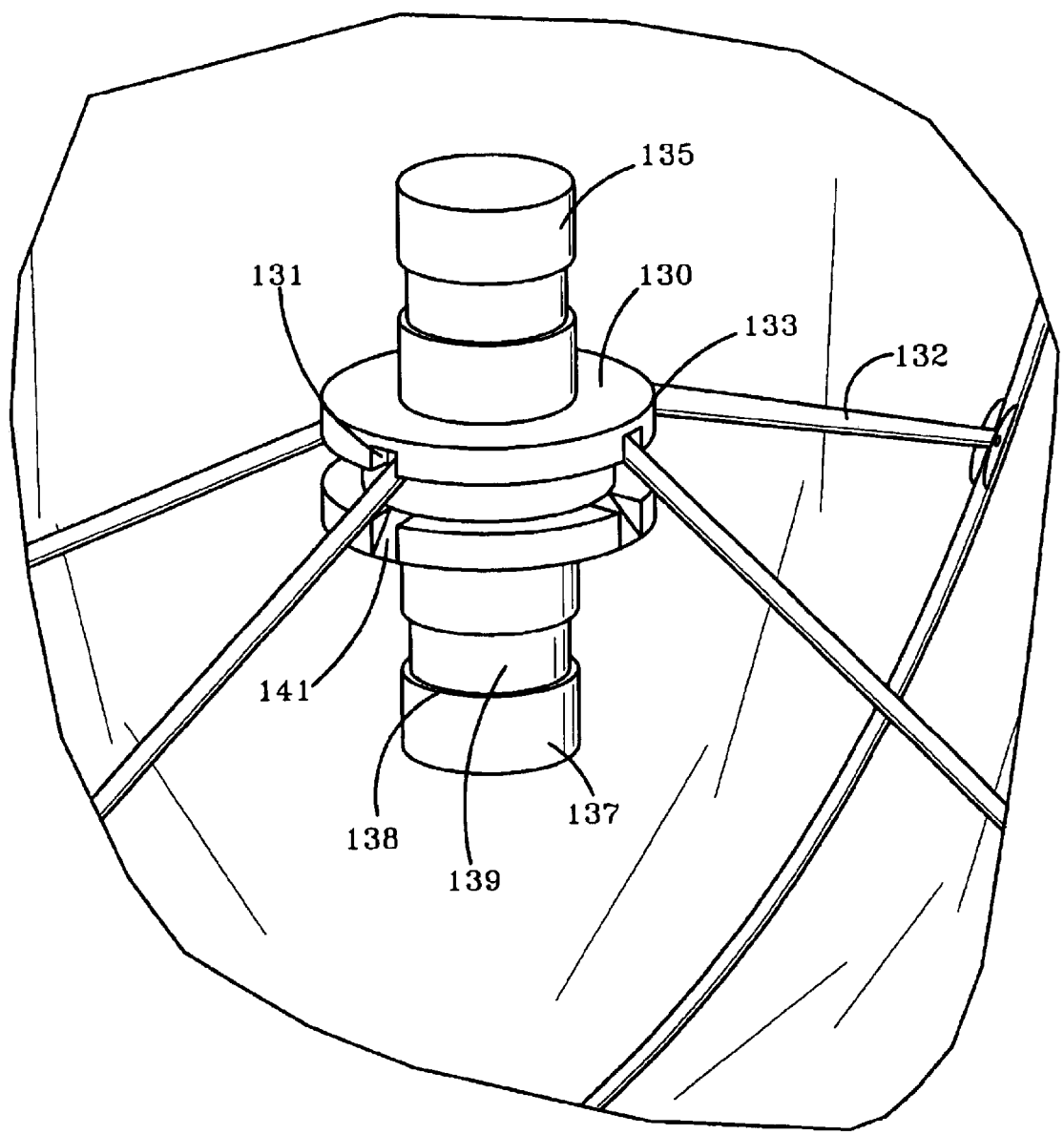
FIG. 15 is a perspective view of the alternative embodiment showing the spindle.
Figure 16:
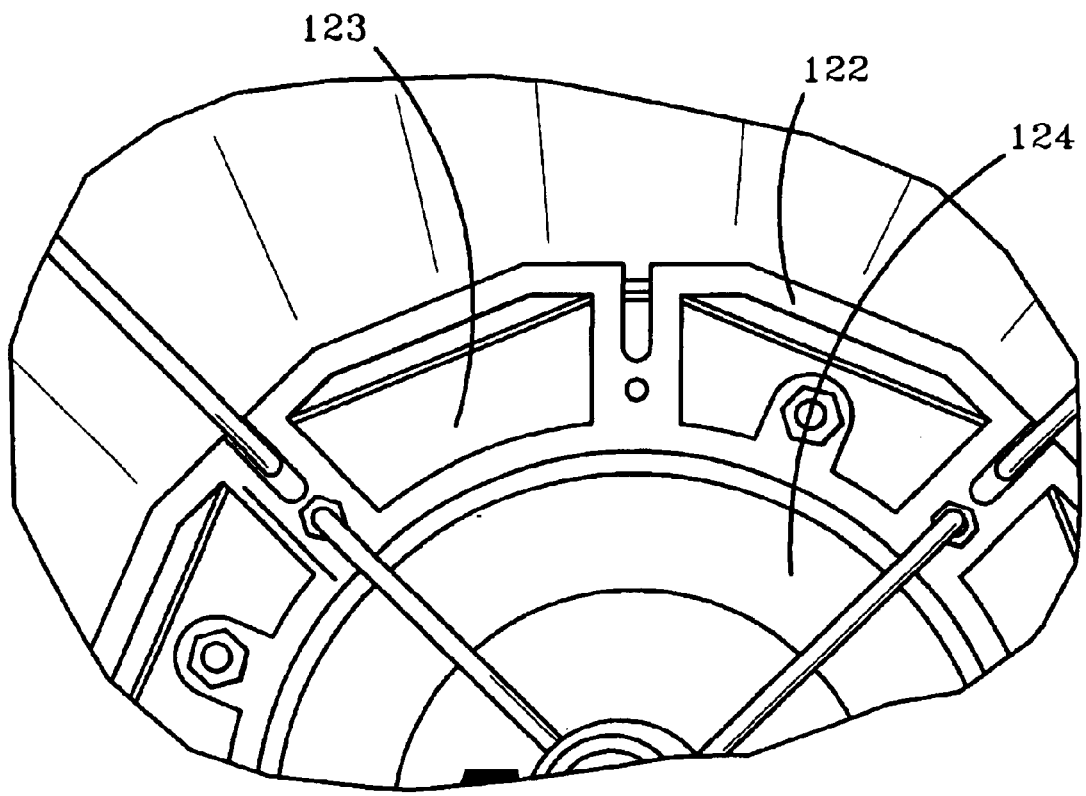
FIG. 16 is a view of the slotted portion of the backplate of the alternative embodiment of FIG. 13.

FIGS. 10, 12 show an inner perceptive view of the first alternative embodiment showing the octagonally-shaped backplate 22. Additionally, the non-telescoping post 114 is also shown. In this embodiment, similar to FIG. 1, the umbrella locking clip 30 is utilized in order to secure locking member 76 (of FIG. 1) in its assembled position. This Figure also shows the location where ribs 60 meet frame 12 at a second hinge means 116. This second hinge means 116 secures the ribs 60 to the backplate 22.

Figure 11:
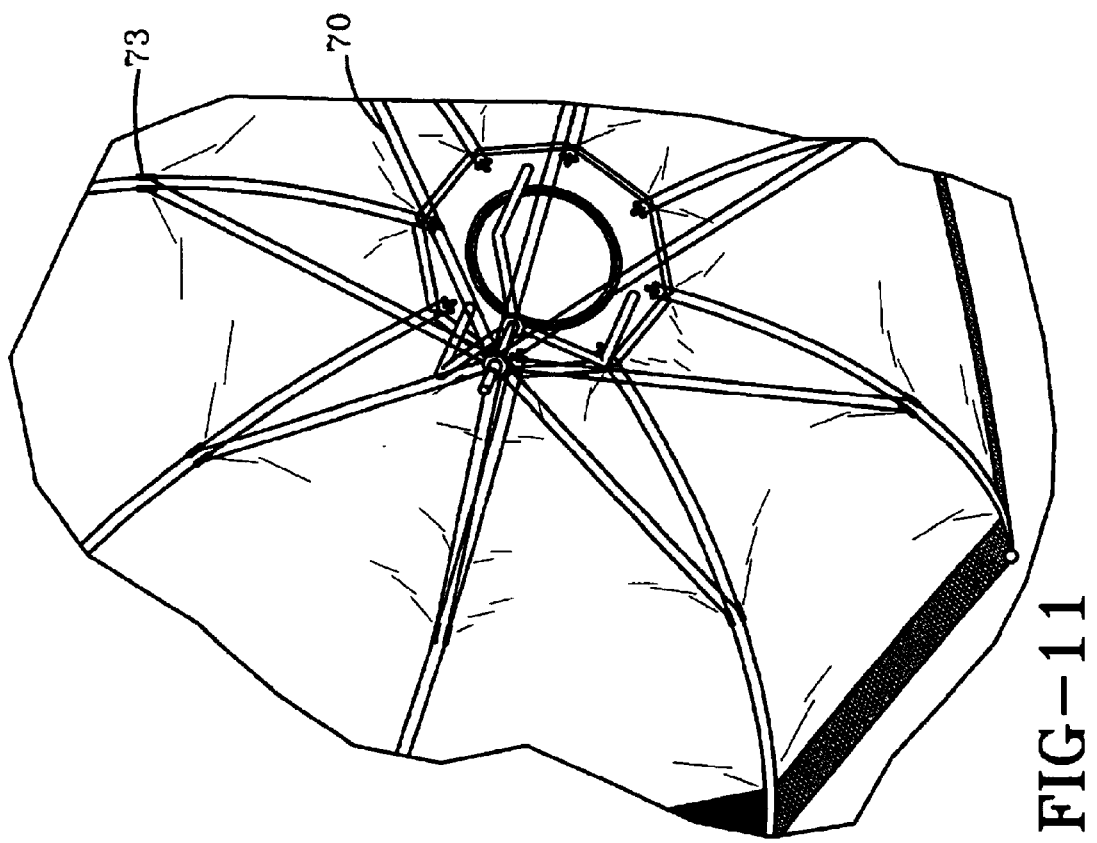
FIG. 11 is an inner perspective view of the first alternative embodiment in an assembled state.

With reference to FIG. 11, the octagonally-shaped alternative embodiment is shown in an assembled state. Again, it is preferred that the struts 70 have a hinge point located at first hinge means 73 such that assembly is eased by having the struts 70 deflect inwardly toward the backplate 22.

FIGS. 13–19 show a second alternative embodiment 120 for the present invention. The second alternative embodiment utilizes a backplate 122 having slotted portions 123 and rib slots 134. The slotted portions 123 are to allow air ventilation for various adaptive units that are attached to the backplate 122 via the adapter 124. While the Figures show backplate 122 closed to outside air ventilation, it is preferred that slots 123 are open to the air and, thus, fabric 14 is also open accordingly. The backplate 122 is shown in a non-circular design, in its preferred embodiment. However, alternative embodiments of this type of backplate 122 configuration are well within the scope of this invention. It is preferred to have a non-circular, non-square backplate for assembly purposes of the fabric material, which will be explained further herein in association with FIGS. 20–21. The second embodiment 120 also includes circumferentially-spaced support posts 24 which are secured to the backplate 122 at a first end 118 and secured to a hub 126 at a second end 1 19. The first end 118 of the support post 24 is spaced 90 degrees from the second end 1 19. The support posts 24 are shown in a spider-like configuration and serve to anchor a hub 126.

The hub 126 includes a locking means 128 to lock a spindle 130 in an assembled position. In its preferred embodiment, the locking means 128 is a set screw. The hub 126 includes a spindle receiver 127, which accepts spindle 130 within its opening, and a flange portion 129 for stability purposes. While the flange portion 129 is desirable, it is not needed.

Spindle 130 includes a spindle hinge recess portion 131 to accept struts 132 therein. Spindle 130 also includes flange portion 133 that has the aforementioned recess portion 131 within it. A grasping knob 135 is also included on the spindle 130 to make it more easily handled by a user to assemble and disassemble. Male portion 137 of spindle 130 is inserted within spindle receiver 127 of the hub 126 and secured therein, in its assembled state, by locking means 128. In its preferred embodiment, male portion 137 includes a shoulder 138 and an inner portion 139. When assembled in its preferred embodiment, locking means 128, preferably the set screw, comes into contact with inner portion 139 whose diameter is less than shoulder 138. Therefore, shoulder 138 does not permit disassembly unless locking means 128 is rotated out of contact with inner portion 139 and shoulder 138. Spindle 130 further includes an elongated recessed portion 141 for struts 132. However, elongated recess portion 141 is unnecessary but adds stability to the struts 132.

Figure 17:
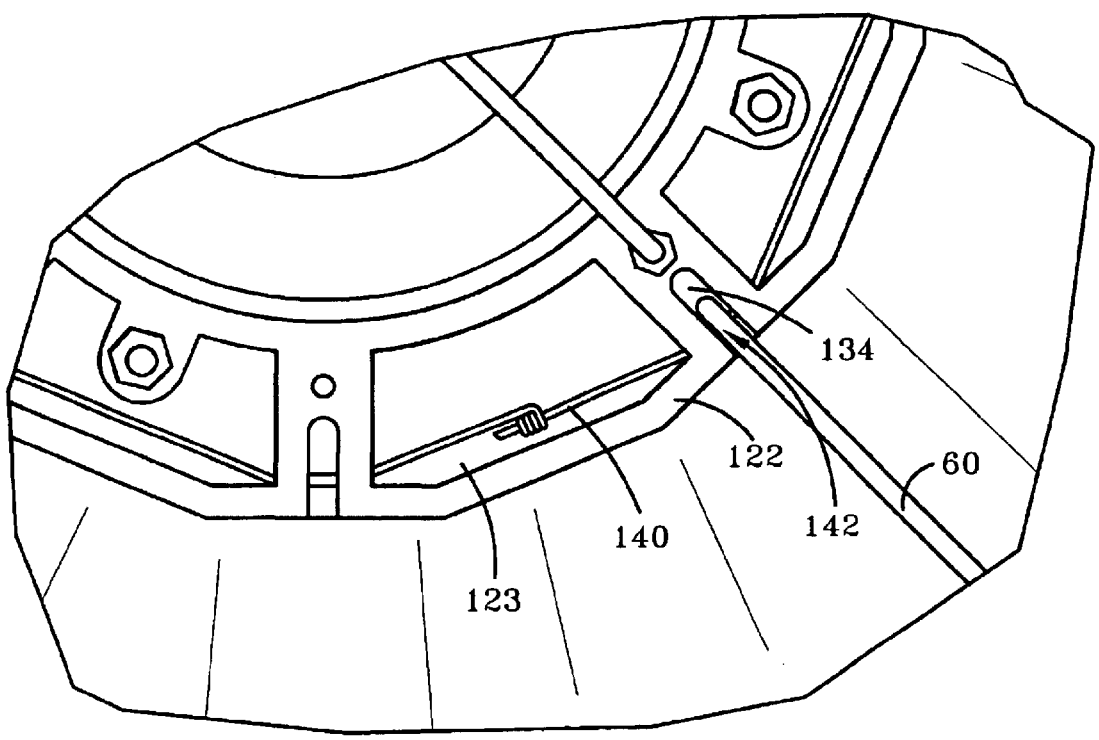
FIG. 17 is a view of the backplate showing the rib securing means.
Figure 18:
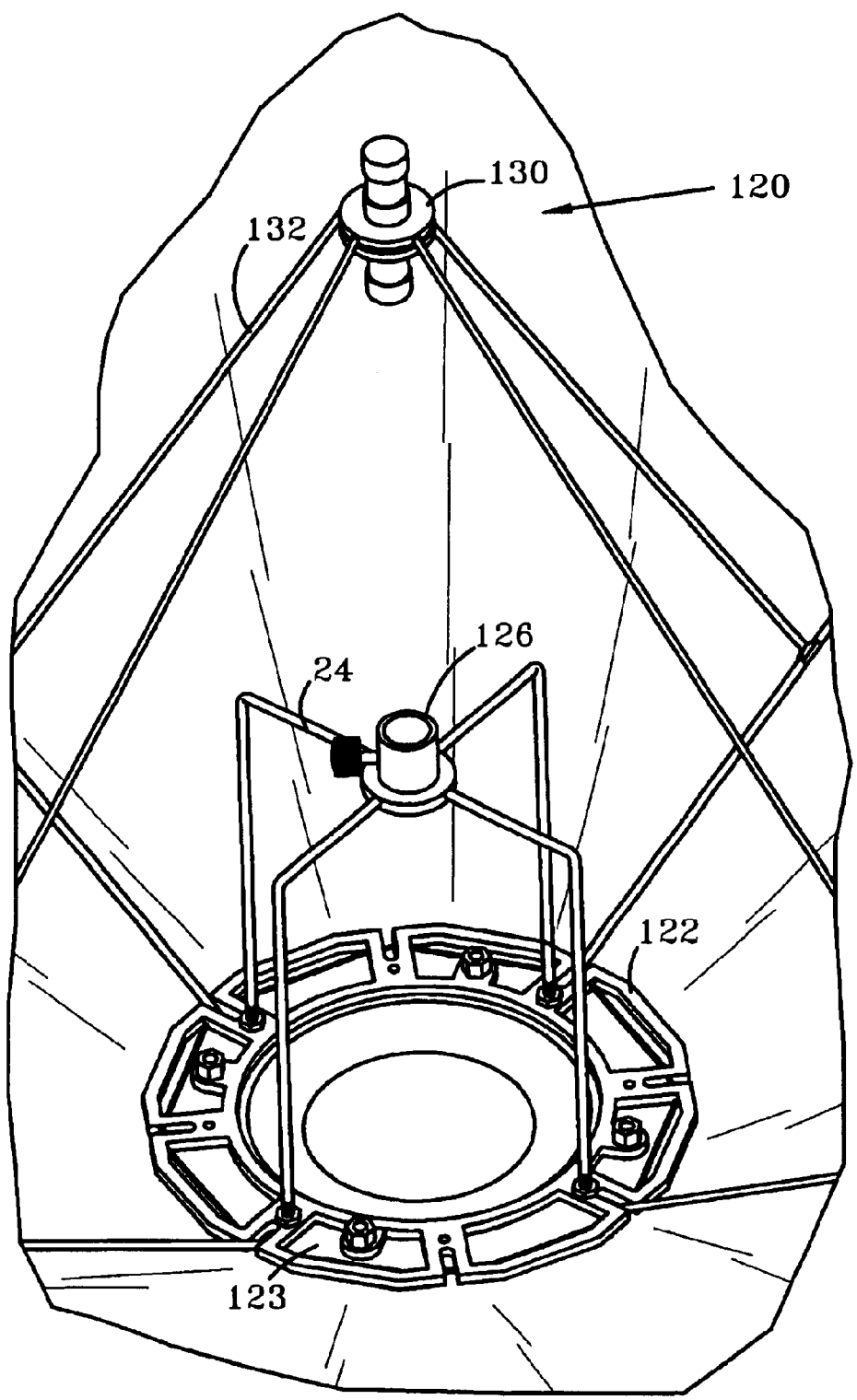
FIG. 18 is a perspective view of the alternative embodiment of FIG. 13 in an unassembled state.
Figure 19:
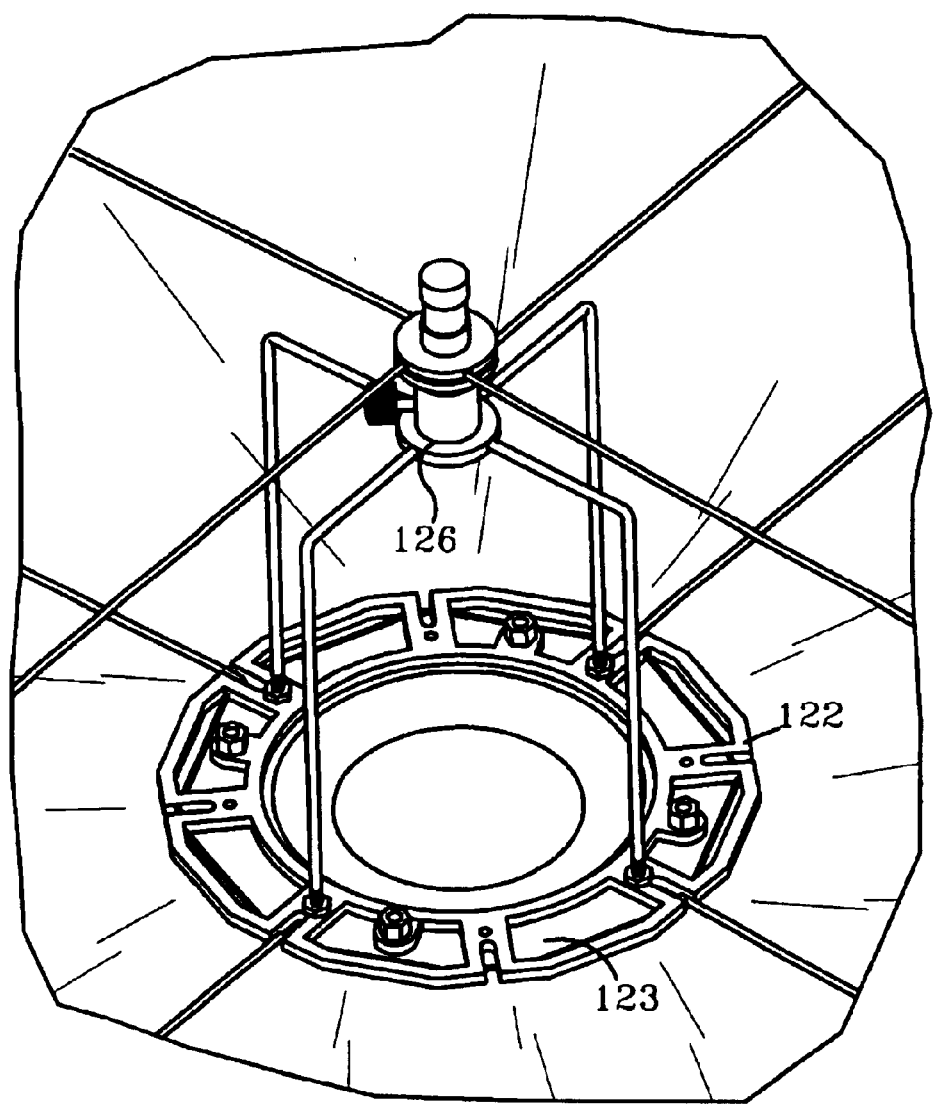
FIG. 19 is a perspective view of the alternative embodiment of FIG. 13 showing the softbox in an assembled, locked position.

With continuing reference to FIGS. 13–19, and particular reference to FIG. 17, a rib securing means 140 is shown. In its preferred embodiment, rib securing means 140 is a steel wire. The steel wire 140 also acts as a hinge means for the ribs 60. The rib securing means 140 is located within the backplate 122. It extends circumferentially to engage the ribs 60. Ribs 60 are located within rib slots 134 and have an opening/hole that accepts the rib securing means 140 therethrough. The ribs 60 are able to rotate within rib slots 134 and around rib securing means 140. This preferred manner of attaching the ribs 60 yields great advantages from an assembly standpoint. In its preferred embodiment, the wire 140 is easily manipulated within the opening 142 of ribs 60 and circumferentially extends to all of the ribs 60. While the wire 140 is shown as one continuous wire having its ends, secured, it is within the scope of this invention to have separate wires or pins, etc., each securing each rib 60 to the backplate 122.

Figure 20:
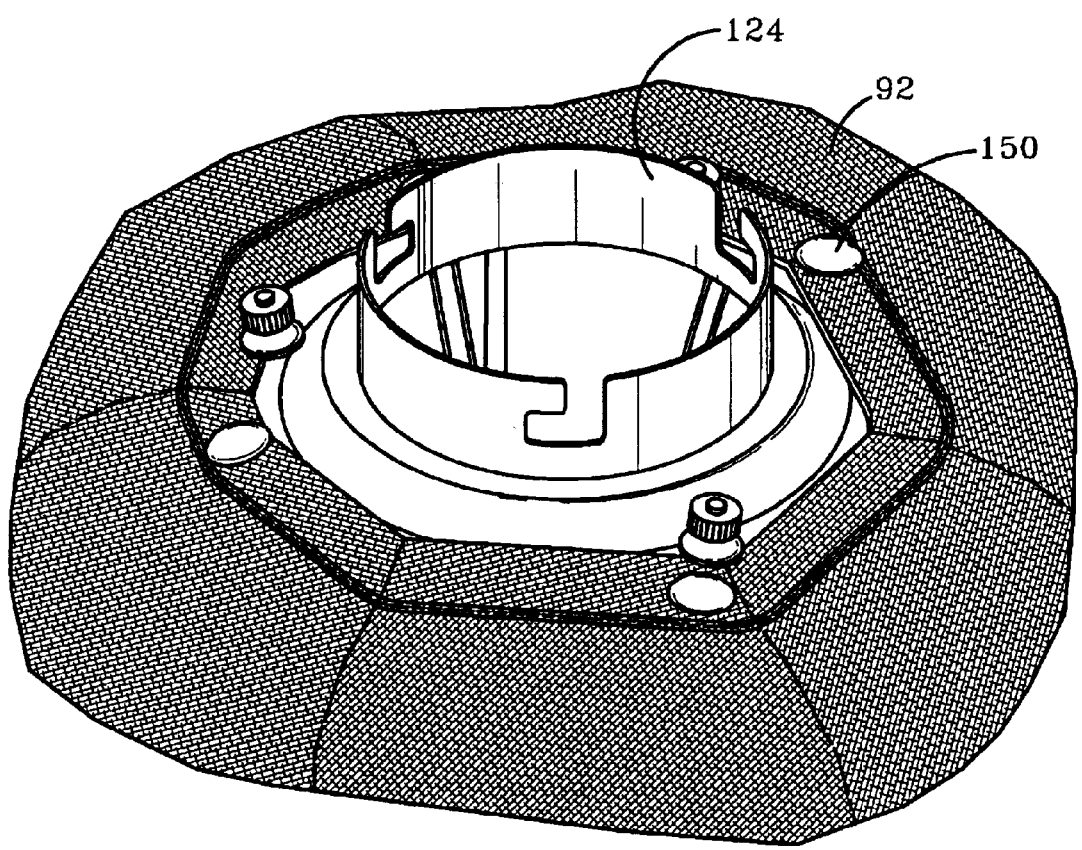
FIG. 20 is a perspective view showing the outer layer fabric attached to the backplate.
Figure 21:
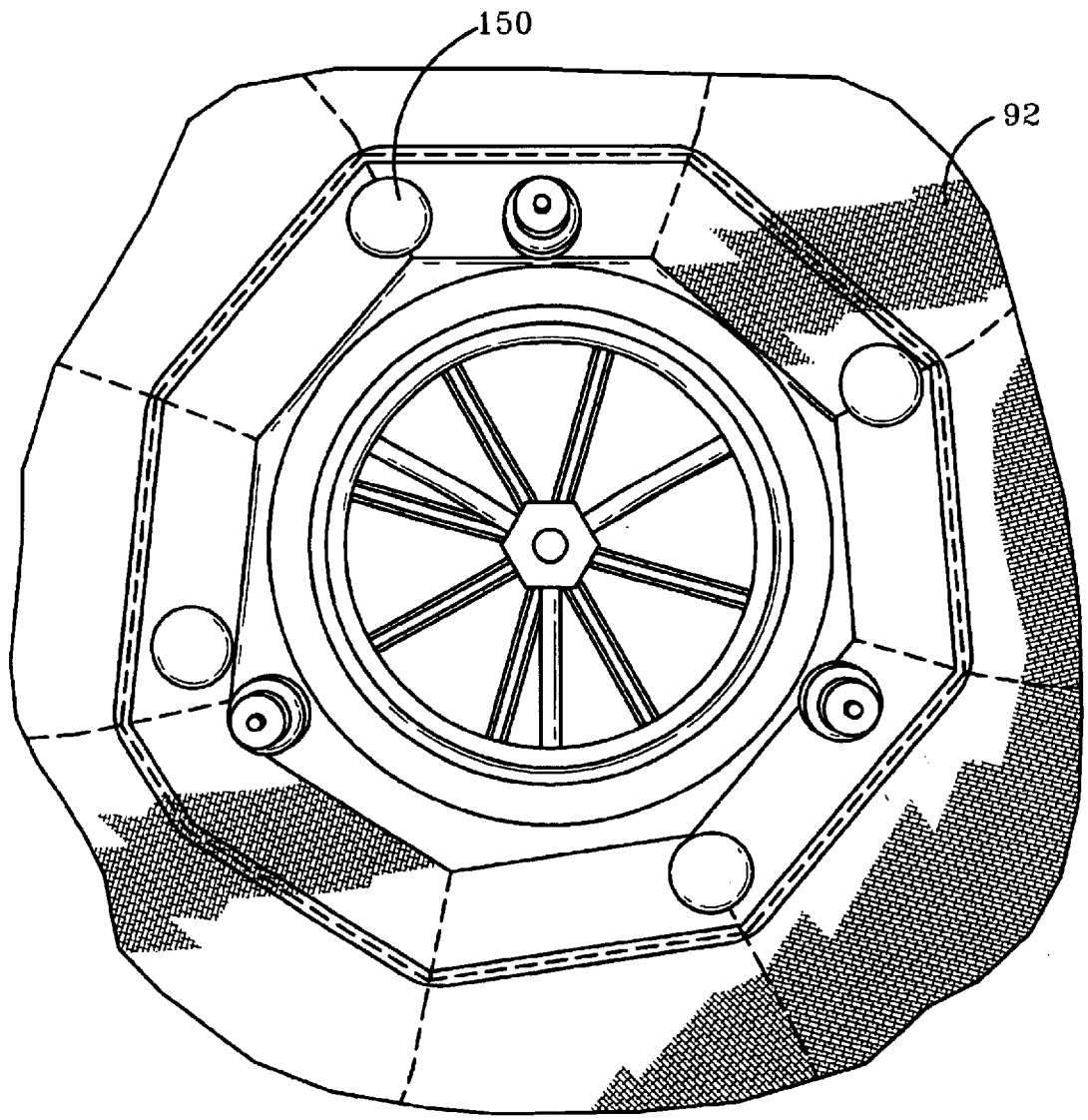
FIG. 21 is a bottom view showing the outer layer of fabric attached to the backplate.

Now turning to the outer portion of the folding softbox 10, FIGS. 20–21 show a backplate having secured thereto outer fabric layer 92. The outer layer 92 is generally a reflective material laminated to a black backing. The black backing is totally opaque so as to block out all unwanted light. The outer layer 92 may also be a defused translucent material. This allows the photographer to have the ability to a large diffused light source that directs light in all directions. FIG. 20 shows a perspective view of the outer fabric layer 92 secured via securing means 150. In the preferred embodiment, securing means 150 are snaps. However, hook and loop fasteners as well as other means to attach the outer layer 92 are within the scope of this invention. More particularly, with respect to outer layer 92 and its securing means, the outer layer 90 works most beneficial where the backplate is not circular or square in shape. Where the backplate is circular or square in shape, the outer layer 92 is much more difficult to attach since it typically is a black sheath material and has to be altered in a much more difficult manner for these shapes. It is more readily able to be secured to an octagonal shape, however, it can be done to all shapes of the backplate. In the preferred embodiment, the slotted portion 123 of backplate 122 and will be open for air ventilation, thus outer layer 92 must also have corresponding openings therein.

Figure 22:
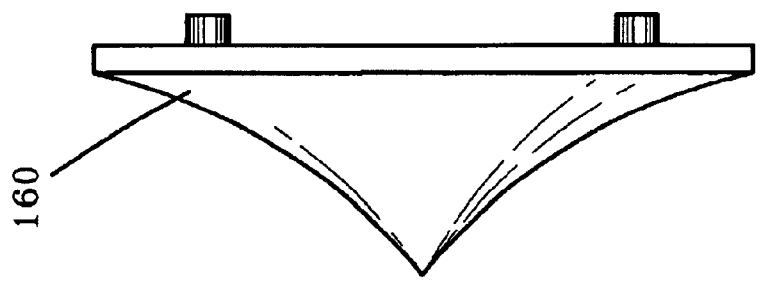
FIG. 22 shows side views of an alternative embodiment for the deflector.
Figure 22:
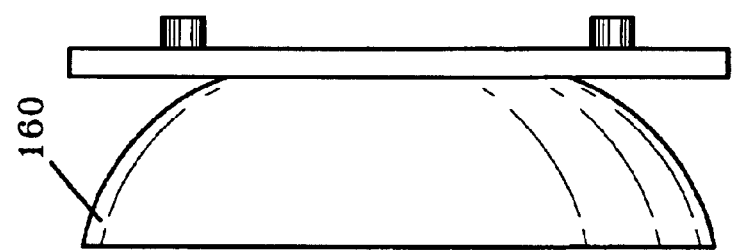
Figure 22:

With respect to FIG. 22, various deflectors are shown in accordance with this invention. The deflectors 160 are attached to the support posts 24 via any securing means. These deflectors can take various forms and shapes, such as concave or parabolic, convex, etc.

Figure 23:
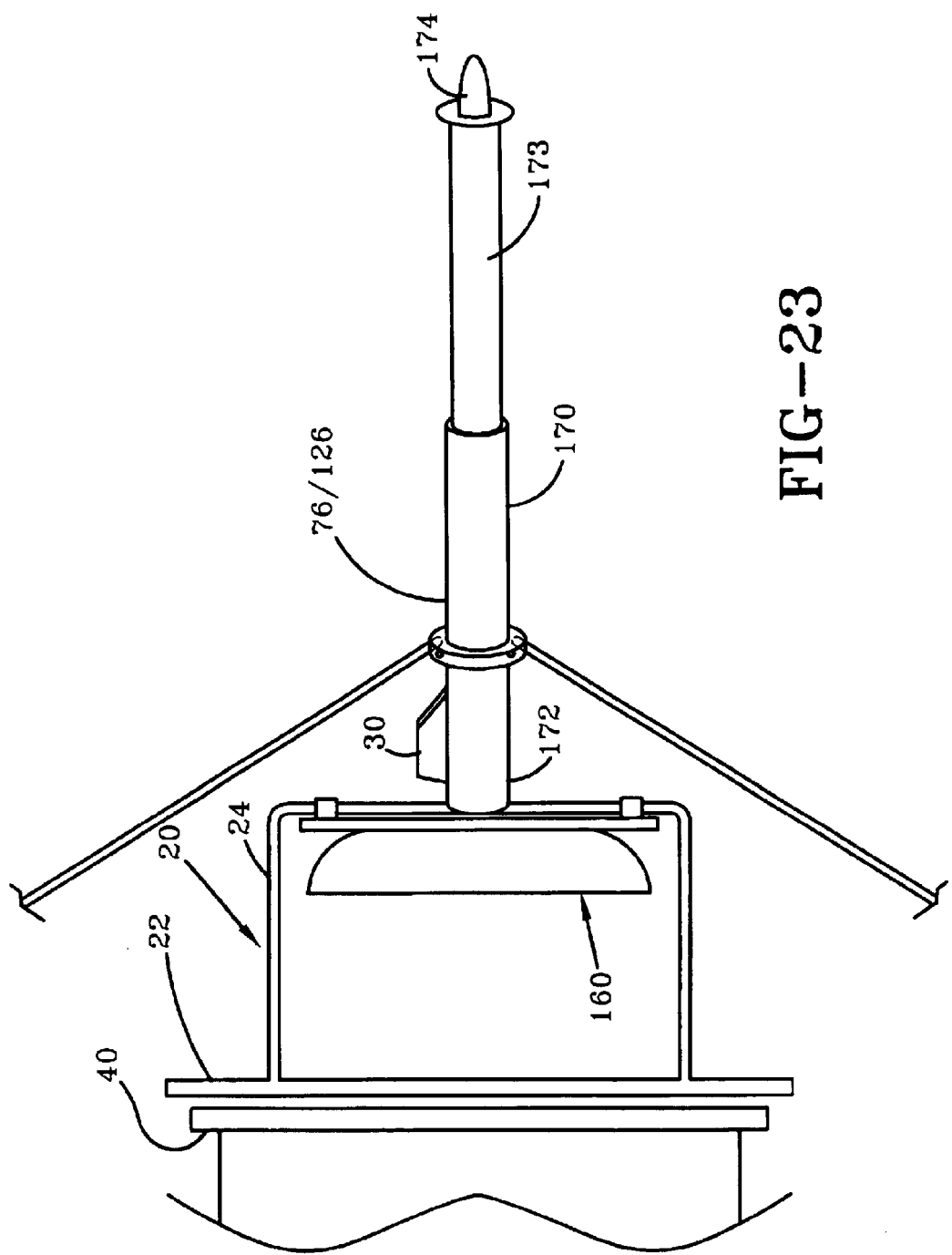
FIG. 23 is a view assembly in an unassembled state of an alternative embodiment of the present invention.

With respect to FIG. 23, another alternative embodiment is shown, utilizing the telescoping central posts 28. In an alternative embodiment of the telescoping embodiment shown within FIG. 2, FIG. 23 shows a telescoping central post 170 having a first portion 172 and a last portion 173.

The first telescoping portion 170 may have intermediate portions between the first telescoping portion 172 and last telescoping portion 173. In its preferred embodiment, the last telescoping portion 173 attaches to a stop 174. The stop 174 ensures that the locking member/hub 76/126 (depending upon which embodiment) does not separate from the telescoping central post 170. Additionally, stop 174 acts as a mechanism to enable the user to push, hold, and comfortably center the locking member 76 or hub 126 back into a locked position.

In operation, in the preferred embodiment of FIG. 1 is assembled by grasping locking member 76, which is already upon central post 28 and sliding it downwardly toward backplate 22 past umbrella locking clip 30 to its secured position. The struts 70 work together to open the softbox to an open position moving within hinges 73. Typically, upon reaching a position past perpendicular of struts 72 to 70 to central post 28 (i.e., less than 90 degrees) pushing of the locking member 76 requires less force, where it is actually pulled toward backplate 22. Disassembly occurs by depressing umbrella locking clip 30 far enough to release locking member 76 and pulling locking member upwardly, or away from backplate 22. In the embodiment shown within FIG. 1, if the central posts are non-telescoping, then locking member 76 is no longer in contact with central post 28 at its highest position. However, if central post 28 is telescoping, contact is continual throughout the closing of the softbox until it travels to its full range of motion, or until it reaches stop 174 of FIG. 23.

The alternative embodiment shown within FIGS. 13–19 will now be set forth in operation. Beginning from an unassembled position, a user grasps spindle 130 and proceeds downwardly if the adapter is placed upon the ground and on the outer layer 92 of fabric 90. Again, upon reaching a point past perpendicularity, struts 132 actually aid the user in directing the spindle 130 into the hub 126. Upon insertion of the spindle 130 into hub 126, the locking means 128 is utilized to lock the hub 126 within the spindle 130. This downward movement of spindle 130 also causes struts 132 to rotate within their respective hinge members. Upon releasing/unlocking locking means 128 and pulling upon spindle 130 upwardly to its point of highest return, the softbox is then folded into an upright position enabling the user to secure the softbox to a transportation mode much more easily than the prior art devices.

The invention has been described with reference to the preferred embodiments. Obviously, modifications and alterations will occur to others upon reading and understanding the preceding detailed description. It is intended that the invention be construed as including all such modifications and alterations insofar as they are within the scope of the appended claims or the equivalents thereof.

Having thus described the invention, it is now claimed:

1. A folding softbox having at least one layer of fabric, the folding softbox, comprising:
   a collapsible frame, comprising:
      a backplate;
      a plurality of support posts extending from said backplate, wherein said plurality of support posts are circumferentially spaced about said backplate, each of said support posts having a first end and a second end, wherein said first end is spaced 90 degrees from said second end;
      a hub connected to said plurality of support posts, said hub having a spindle receiver;
      a plurality of ribs pivotably connected to said backplate; and,
      a plurality of struts, each of said struts having a first end and a second end, said first end connected to one of said plurality of ribs, said second end connected to a spindle, a portion of said spindle adapted to be received within said spindle receiver.

2. The folding softbox of claim 1, wherein said backplate further comprises a plurality of slotted portions, said plurality of slotted portions adapted to allow air ventilation.

3. The folding softbox of claim 1, wherein said backplate further comprises a plurality of rib slots, each of said rib slots adapted to stabilize one of said plurality of ribs.

4. The folding softbox of claim 1, wherein said hub further comprises a set screw to secure said spindle in said spindle receiver.

5. The folding softbox of claim 1, wherein said hub further comprises a flange portion extending outwardly from the circumference of said hub, said flange portion adapted to stabilize said hub.

6. The folding softbox of claim 1, wherein said spindle further comprises a flange portion, said flange portion having a plurality of spindle hinge recess portions to accept one of said plurality of struts.

7. The folding softbox of claim 1, wherein said spindle further comprises a male portion, said male portion adapted to be received within said spindle receiver of said hub.

8. The folding softbox of claim 6, wherein said flange portion further comprises a plurality of elongated recess portions, each of said plurality of elongate recess portions adapted to stabilize one of said plurality of struts.

9. The folding softbox of claim 1, wherein said backplate further comprises rib securing means extending circumferentially within said backplate to engage each of said plurality of ribs.

10. The folding softbox of claim 1, wherein each of said ribs has a mid-span region, wherein said first end of one of said struts hingedly connects to said mid-span region of one of said ribs.

11. The folding softbox of claim 1, wherein said plurality of struts are adapted to be held less than 90 degrees relative to said spindle.

12. A method of operating a folding softbox, the softbox having an operational state and a storage state, the steps comprising the steps of:
   providing a collapsible frame, the collapsible frame comprising a backplate, a plurality of support posts extending from said backplate, a hub connected to said plurality of support posts, said hub having a spindle receiver, a plurality of ribs pivotably connected to said backplate; and,
   a plurality of struts, each of said struts having a first end and a second end said first end connected to one of said plurality of ribs, said second end connected to a spindle, a portion of said spindle adapted to be received within said spindle receiver;
   moving said spindle downwardly towards said hub;
   rotating said struts about said first ends; and,
   inserting a portion of said spindle into said hub.

13. The method of claim 12, wherein said hub further comprises locking means, wherein the method further comprises the step of:
   locking said portion of said spindle within said hub with said locking means.

14. The method of claim 13, further comprising the steps of:
   releasing said locking means;
   pulling said spindle upwardly to its point of highest return; and, folding said softbox into an upright position.

15. The method of claim 12, further comprises the step of:

positioning said plurality of struts post-perpendicular to said spindle.

16. A folding softbox having an inner layer of fabric and an outer layer of fabric, the softbox comprising:
- a collapsible frame, said frame comprising:
    - a backplate having
        - a plurality of slotted portions, said slotted portions adapted to allow air ventilation;
        - a plurality of rib slots defined in said back plate, each of said rib slots adapted to stabilize one rib;
        - rib securing means extending circumferentially about said backplate and through said plurality of slotted portions to engage said ribs;
    - a plurality of support posts extending from said backplate, each of said support posts having a first end and a second end, wherein said first end is spaced 90 degrees from said second end;
    - a hub connected to said plurality of support posts, said hub having a spindle receiver;
    - a plurality of ribs pivotably connected to said backplate; and,
    - a plurality of struts, each of said struts having a first end and a second end, said first end connected to one of said plurality of ribs, said second end connected to a spindle, a portion of said spindle adapted to be received within said spindle receiver, said plurality of struts positioned post-perpendicular to said spindle.

* * * * *